United States Patent

La Marche et al.

[15] 3,673,355

[45] June 27, 1972

[54] COMMON CONTROL DIGITAL ECHO SUPPRESSION

[72] Inventors: Robert Ernest La Marche, Atlantic Highlands; Carl Jerome May, Jr., Holmdel, both of N.J.

[73] Assignee: Bell Telephone Laboratories, Incorporated, Murray Hill, N.J.

[22] Filed: Sept. 2, 1970

[21] Appl. No.: 68,921

[52] U.S. Cl. .......... 179/170.6

[51] Int. Cl. .......... H04b 3/20

[58] Field of Search .......... 179/170.6, 170.2

[56] References Cited

UNITED STATES PATENTS

| | | | |
|---|---|---|---|
| 3,562,448 | 2/1971 | May | 179/170.6 |
| 3,560,669 | 2/1971 | Foulkes | 179/170.2 |
| 3,305,646 | 2/1967 | Brady | 179/170.2 |

*Primary Examiner*—Kathleen H. Claffy
*Assistant Examiner*—William A. Helvestine
*Attorney*—R. J. Guenther and R. B. Ardis

[57] ABSTRACT

Circuitry for accomplishing digital echo suppression for a plurality of two-way transmission circuits is disclosed. Analogue signal levels on each line of each associated transmit-receive pair are periodically converted into pcm codes and applied to common time-shared circuitry, which includes a time-divided memory, in the time slot allocated for that pair. The common circuitry translates the pulse codes into echo suppressor control signals by combining them with code signals representing the past signal bearing statuses of the lines and timing signals stored in the time-divided memory to determine if the respective present activity statuses of the line pair are such that echo suppression is required.

17 Claims, 10 Drawing Figures

INVENTORS R. E. LA MARCHE
C. J. MAY JR.
BY [signature]
ATTORNEY

| $O_{Li}+1$ | $O_{Li}-1$ | $O_{Li}=1$ |
|---|---|---|
| $IDLEO \cdot (N_{Li} \geq S_o)$<br>$OT \cdot (N_L > O_L)$<br>$ODD \cdot (N_L > O_L)$<br>$OHO \cdot (N_L > O_L)$ | $OHO \cdot T_K \cdot (N_L < O_L)$ | $OT \cdot (N_L < S_o)$ |

GRANULARITY PULSES

COMMON CONTROL DIGITAL ECHO SUPPRESSION

BACKGROUND OF THE INVENTION

1. Field of the Invention

This invention relates to the field of time-divided communication systems and more particularly to digital echo suppression in two-way time-divided communication systems using common time-shared control circuitry.

2. Description of the Prior Art

Echo suppressors are primarily signal controlled devices which insert a large attenuation in the echo path of a two-way transmission connection while signals are being transmitted over the other path. In general, an echo suppressor detects the presence of a signal on the line over which information is being received and responds by activating a switching device that inserts an attenuator in series with the line that represents the return path. Any echo signals propagated through the receiving terminal are dissipated by the attenuation inserted in the return path before they can reach the transmitting terminal. The deactivation of the switching device, upon the occurrence of a null in the received signal, is delayed a selected interval in order to accommodate signals of varying amplitude, such as speech. This delayed deactivation is provided to insure that the echo suppression attenuation is not removed from the echo path when the received signal merely drops below the activation threshold temporarily.

A method of, and apparatus for, accomplishing digital echo suppression in a signal controlled transmission system using common time-shared digital circuitry is disclosed in patent C. J. May, Jr., U.S. Pat. No. 3,562,448, issued Feb. 9, 1971. Generally, the analogue signals on each line in this system are applied to per trunk threshold detection circuitry that generates discrete amplitude level signals. The amplitude level signal outputs from the threshold detectors of each line pair are repetitively sampled at a uniform rate in the system. According to the disclosed method, each time a line pair is sampled the amplitude level signals present at the output of the threshold detector for each line are applied to the common time-shared digital circuitry. The common circuitry combines the information represented by the two sets of digitized level signals with selected digital signals that are a function of the digitized values obtained from past samples of the pair to determine if each line in the pair is active or idle. Echo suppression is activated when the statuses of the line pair satisfy the equation;

$$ES = LE(idle) \cdot LO(active) \qquad (1)$$

where ES indicates that echo suppression is activated, LE(idle) indicates that there is no signal on the even line, and LO(active) indicates that there is a signal on the odd line. In other words, when the transmitting or, alternatively, the even line signal level indicates that no information is being sent over that line, and the receiving or, alternatively, the odd line signal level indicates that there is information on that line, echo suppression will be activated by the common digital circuitry. Similarly, if the signal levels on a pair of lines for which echo suppression has been activated in the past take on values such that Equation (1) is no longer satisfied, echo suppression will be deactivated.

SUMMARY OF THE INVENTION

Applicants have invented circuitry for accomplishing digital echo suppression in a time-divided transmission system that requires no per trunk threshold detector circuitry. The invention is capable of providing echo suppression in systems where the line pairs are carrying either analogue signals or digital code signals. Basically, the invention operates to provide echo suppression in accordance with Equation (1) discussed in the preceding section.

It is an object of this invention to utilize digital techniques in echo suppression circuits.

It is another object of this invention to capitalize on the economies realizable from time-sharing circuitry in accomplishing echo suppression in a signal controlled transmission system.

Yet another object of the invention is to utilize digital codes representing amplitude levels of received and transmitted signals to determine when echo suppression is required in a two-way transmission system.

A more specific object of the invention is to eliminate the need for per trunk level detection circuitry in a common echo suppressor.

Another specific object of the invention is to control echo suppression by combining digital codes representing signal levels on a transmit-receive line pair with stored code signals which are a function of past signal amplitude statistics for this line pair.

Yet another specific object of the invention is to utilize digital techniques in conjunction with signal level statistics in implementing echo suppression in a signal controlled transmission system using common time-shared logic.

Yet another specific object of the invention is to minimize the effect of impulse noise on the operation of an echo suppressor.

One of the advantages of applicants' invention is that it reduces the cost of providing echo suppression in multiplexed transmission systems using common time-shared logic by eliminating the need for expensive per trunk threshold detection circuitry. Another advantage is that the invention may be modified to accommodate different types of signals having different amplitude variation statistics without changing any circuit components. Yet another advantage is the ability to more precisely control the intervals during which echo suppression is activated due to noise, or otherwise, thereby minimizing the time a transmit line may not be used due to the existence of unneeded echo suppression.

GENERAL DESCRIPTION OF THE INVENTION

Figure 6:
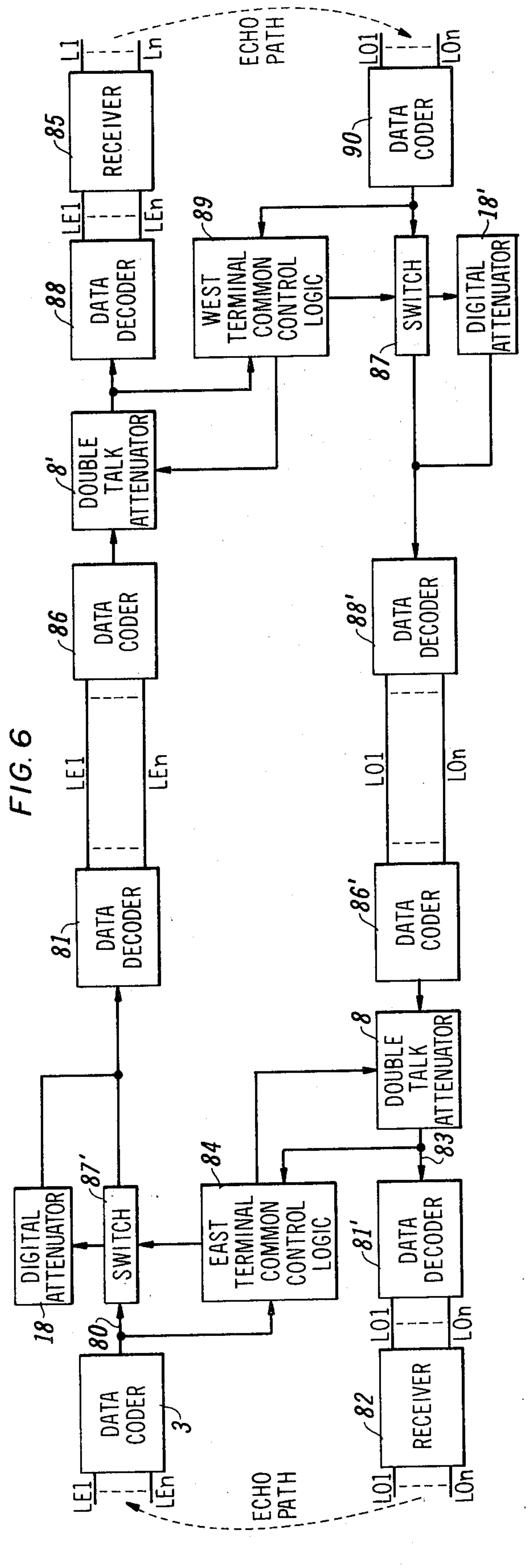
FIG. 6 shows a general functional block diagram of a two-terminal communication system incorporating applicants' invention as a split echo suppressor.

FIG. 6 shows a general functional block diagram of a two-terminal communication system utilizing applicants' invention as a split echo suppressor. Code signal groups representing the analogue signal amplitude sampled on a line $LE_i$ are transmitted in parallel from the east terminal over the line 80. Similarly, code signal groups are received in parallel at that terminal over line 83. The converse is true for transmitting and receiving signals at the west terminal.

At the east terminal a data coder 3 (FIG. 6) samples the analogue signal levels on the lines LE1 through LEn repetitively and generates a pulse code representing the sampled amplitude on each line in the sampling time slot for the line. The bits comprising the code generated by the sampling of a given line $LE_i$ are applied to the east common control 84 (FIG. 6) in the time slot for the line. For purposes of discussion, it will be assumed that the line $LE_i$ at the east terminal is associated with the line $LO_i$ at the west terminal to form a complete two-way path. For this case, the code signals resulting from a sampling of line $LO_i$ by the coder 90 (FIG. 6) at the west terminal will be generated in the same time slot as the code signals resulting from the sampling of line $LE_i$ at the east terminal. The code output of the code 90 is applied to the west terminal common control 89 and to the decoder 88' through switch 87 when echo suppression isn't activated for line $LO_i$ at the west terminal. The decoder 88' translates the digital code back into an analogue signal and this signal is applied to the data coder 86' located at the east terminal where the analogue signal for line $LO_i$ is again translated into a digital code. This code is applied to the east terminal common control 84 through the double talk attenuator 8 and the east terminal decoder 81' which translates the code back into the analogue signal on line $LO_i$. The analogue signal output of the decoder 81' is then applied to the east terminal receiver 82.

The double talk attenuator 8' is provided to reduce echos in a situation where two parties are talking to one another simultaneously. In this situation, both the lines in a line pair will be active. Since the even line is active, Equation (1) will not be satisfied and echo suppression will not be activated. In order to reduce the volume of echos produced by the signal being received on the odd line, the attenuator responds to this condition by attenuating the signal level on the odd line of the pair. The amount of attenuation will vary with the specific system being used but 6 to 10db is a typical figure. This amount of attenuation is sufficient to reduce echos but still allow the individual at the receiving terminal to hear the incoming speech. When the attenuator 8' is not activated it merely passes the received signal unaltered.

When the lines LE1 and LO1 are associated, the code signals representing analogue signal levels on both of the lines are introduced into the east common control 84. The incoming signals generated by line LO1 are applied to circuitry in the common control 84 which uses them to update a statistically determined signal level value. Simultaneously, the signals generated by LE1 are combined with the statistically determined signal level value to determine if echo suppression is needed for the LE1–LO1 line pair at the east terminal. If the combination of the line LE1 signals and the statistically determined signal level value for line LO1 indicates that the requirements of Equation (1) are satisfied, the common control logic 84 generates a signal that enables switch 87' to activate echo suppression at the east terminal for the LE1–LO1 line pair. In essence, the enabling of the switch 87' blocks the transmission of any echo signals on the echo path that are produced by incoming signals on the line LO1 and eliminates echos at the west terminal. When the switch 87' is enabled, the digital attenuator 18 either substitutes low level coded noise for the pcm echo signal on the line or decrements the pcm echo signal to a level below the threshold of hearing. If Equation (1) is not satisfied, switch 87' will be disabled, resulting in echo suppression being deactivated for the line pair.

Simultaneously, the same operations described above occur at the west terminal. The functions of the east terminal decoder 81, the west terminal coder 86, decoder 88, common control logic 89, digital attenuator 18', and the switch 87 are analogous to their respective counterparts described above. Echo suppression is also activated or deactivated at the west terminal in accordance with the requirements of Equation (1). It will be noted that the west terminal differs from the east terminal only in the reversal of the lines considered as transmit and receive lines. In other words, the east terminal transmit line is considered as the west terminal receive line and the east terminal receive line is considered as the west terminal transmit line.

While the above discussion has dealt with the use of the invention in conjunction with an analogue transmission system, it is clear that the invention is readily adaptable for use with a digital transmission system. When using the invention with a digital transmission system, there is no need for the data coders 86 and 86' and the data decoders 81 and 88' (FIG. 6).

Figure 1:
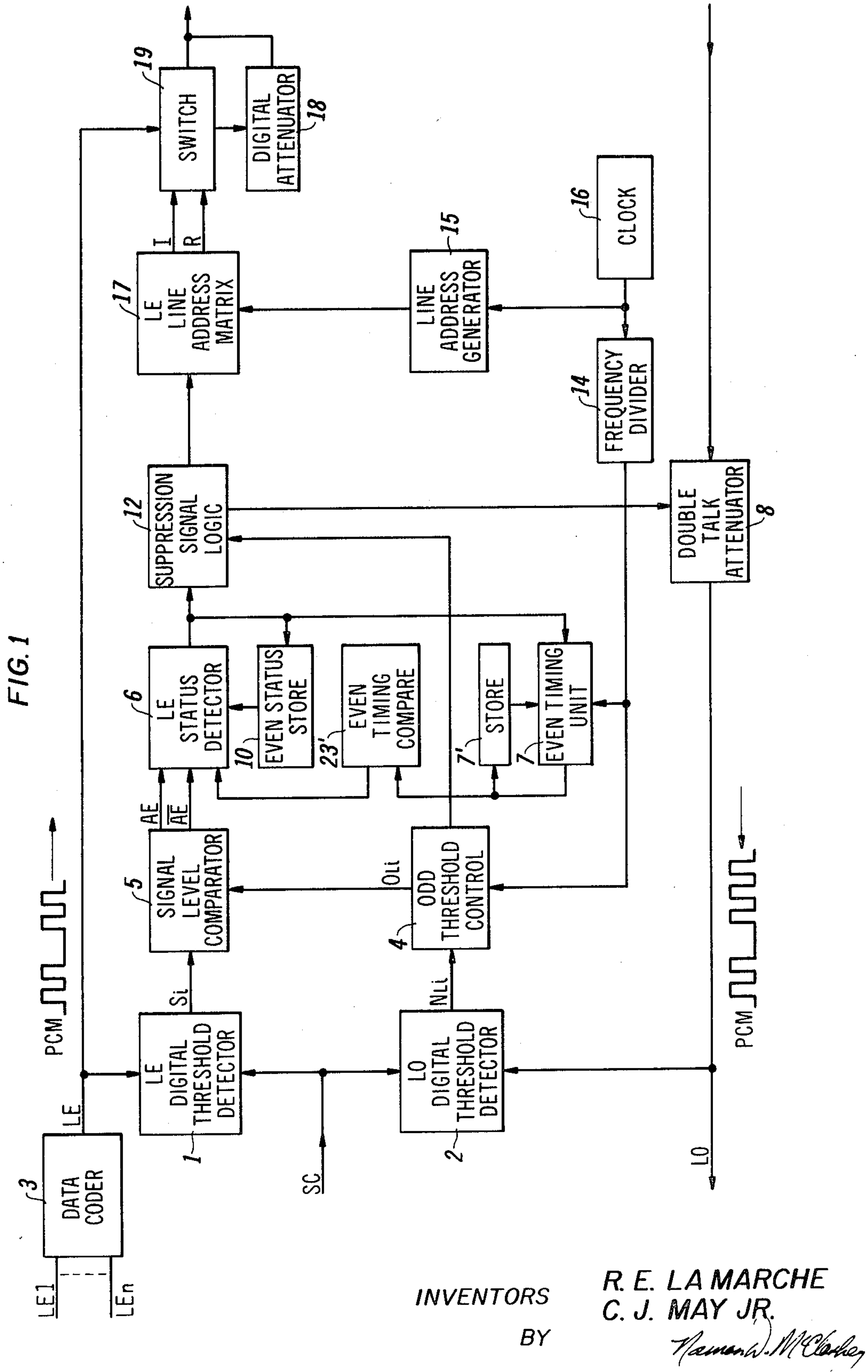
FIG. 1 is a functional block diagram of a split echo suppressor system that provides digital echo suppression.
Figure 4B:
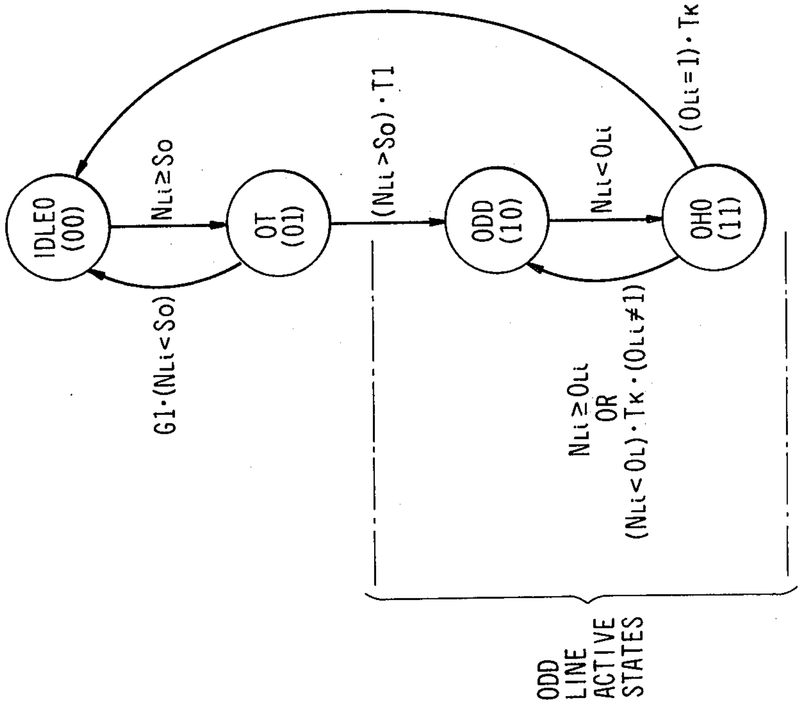
FIGS. 4A, 4B, and 4C are state diagrams useful in describing the operation of the system shown in FIGS. 1 and 2.
Figure 4A:
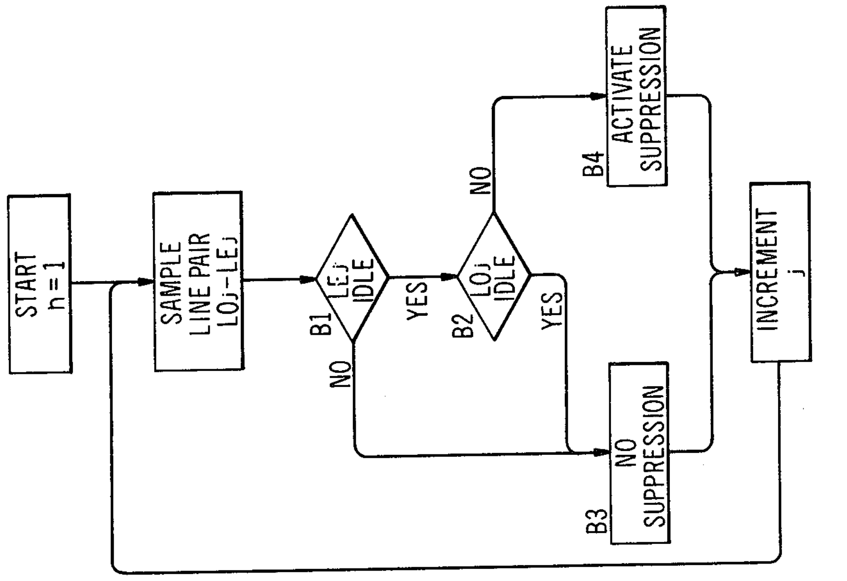

Applicants' invention is most readily understood, generally, when discussed in terms of the diagrams shown in FIGS. 3, 4A, 4B, and 4C. FIG. 4A is a general flow diagram representing the major operations carried out by applicants' invention when it is used as a split echo suppressor. The operation of echo suppression is the same at both the east and the west terminals shown in FIG. 6. Consequently, a discussion of how echo suppression is accomplished at the east terminal sufficiently discloses applicants' invention and avoids the redundancy inherent in discussing echo suppression operation for both terminals. The symbols $LE_j$ and $LO_j$ are used in this figure to represent the even line and odd line in the line pair being sampled. For instance, when signals on the pair LE1 and LO1 shown in FIG. 1 are applied to the common control 84 (FIG. 6), the $LE_j$ and $LO_j$ in FIG. 4A represent these lines.

When the signals on a line pair are applied to the common control 84 (FIG. 6), the flow diagram in FIG. 4A indicates that the first step B·1 taken is to determine if the even line LE1 is idle. That is, it is determined if line LE1 is being used to transmit information at the time the signals on this line are applied to the common control 84. If line LE1 is idle, then an attenuator may be inserted in series with the line without interrupting a transmission of information. Assuming that line LE1 is idle, the next step B·2 is to determine if line LO1 is idle. In this case, line LO1 is considered idle if no information is being received on the line. If line LO1 is idle, there is no need to activate echo suppression and insert an attenuator in series with line LE1 since there is no incoming signal to generate an outgoing echo signal. However, if line LO1 is active, or not idle, this indicates that there are incoming signals on line LO1 and the possibility of an echo signal being generated over the echo path exists. Recalling that line LE1 is assumed to be idle, line LO1 being active satisfies the conditions required by Equation (1) above and echo suppression is activated.

It will be noted that if, during the step B·1 shown in FIG. 4A, it is determined that line LE1 is not idle, the next step B·3 is to deactivate echo suppression. The indication that line LE1 is not idle means that the signals on it may not be attenuated without destroying information being transmitted. Consequently, where line LE1 is not idle, no echo suppression is activated and if echo suppression is already activated, due to past samples of the line pair, it is deactivated.

After completing the foregoing steps for the first line pair, signals on the next line pair are applied to the common control 84 (FIG. 6) and the steps are repeated again. This process will continue until each of the signals on each of the line pairs in an *n* pair system have been applied to the common control 84 and then the process will begin again with the first line pair.

Figures 2, 3:
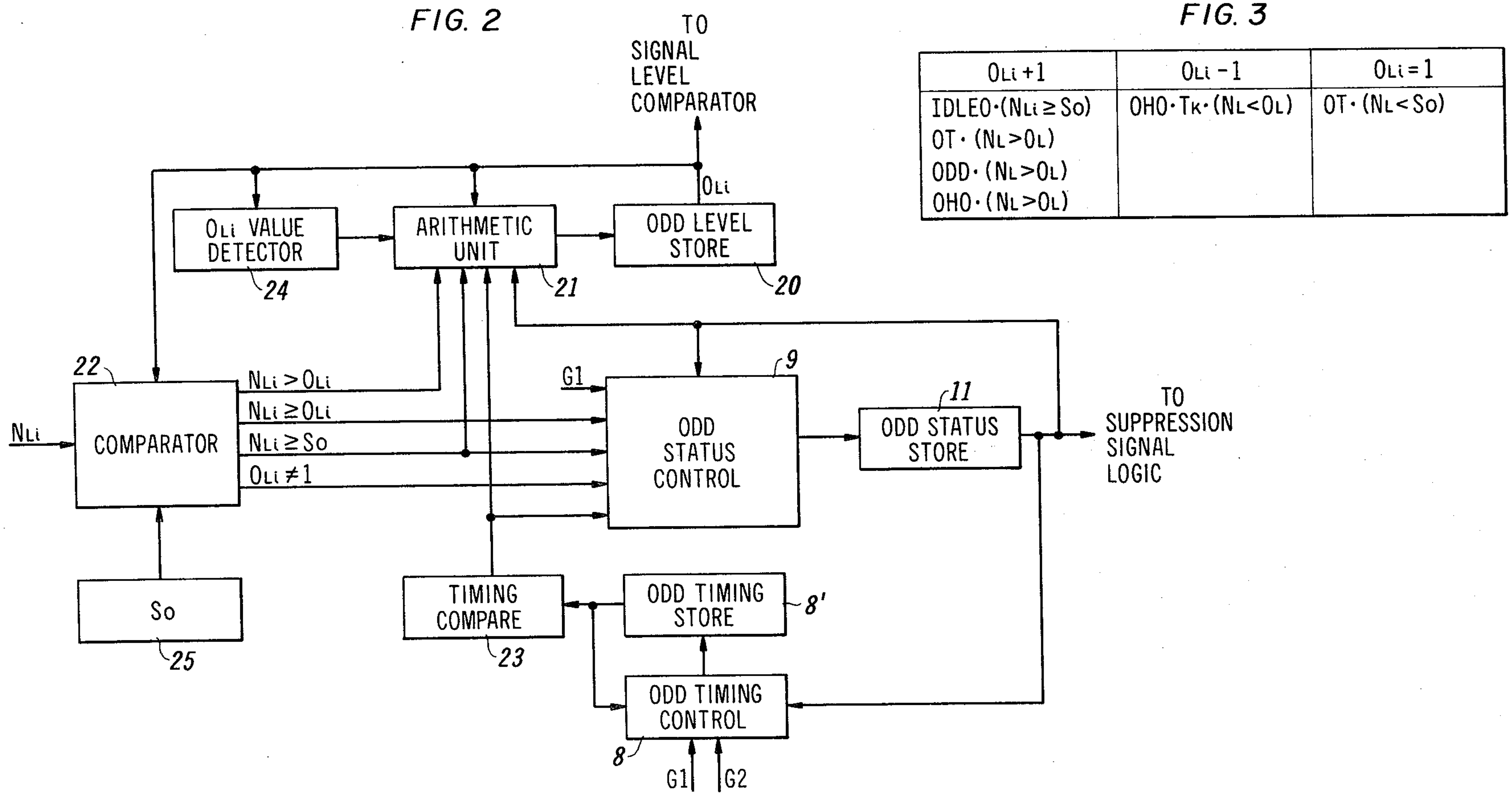
FIG. 2 provides a detailed functional block diagram of odd threshold control shown in FIG. 1.
FIG. 3 shows a table that is useful in the explanation of the operation of the odd threshold control shown in FIG. 2.
Figure 4C:
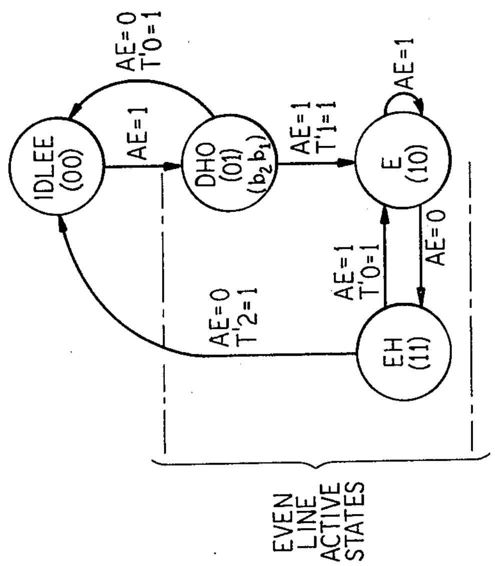

The method of determining if both lines of a line pair are idle is represented by the state diagrams shown in FIGS. 4B and 4C respectively. For instance, at the time the signals on lines LE1 and LO1 (FIG. 1) are applied to the common control, one of the numerical codes in each of the FIGS. 4B and 4C will be available in the even status store 10 (FIG. 1) and the odd status store 11 (FIG. 2). As will be shown later, the LE1 and LO1 input to the common control 84 (FIG. 6) may be from a sampling means that repetitively scans analogue signal levels on the line or the input may be, as shown in FIG. 6, a pulse code representing a sampled analogue amplitude. The codes in FIGS. 4B and 4C represent the activity statuses of the odd and even lines of the pair, respectively, and they are combined with selected signals by the odd threshold control 4 and the LE status control 6 (FIG. 1) to alter each line status code in the manner shown in the figures. It will be noted that there are a number of state codes provided for each line. These are used to provide the delayed activation or deactivation of echo suppression similar to that found in analogue echo suppression systems.

More specifically, assuming that both lines LE1 and LO1 (FIG. 1) have been idle a selected period of time when the signal levels on them are applied to the common control 84 (FIG. 6), their statuses will be that of idle. These states are digitally represented by the codes "00" (FIG. 4C) and "00"

(FIG. 4B) contained in selected locations of the time-divided status stores 10 (FIG. 1) and 11 (FIG. 2) respectively. If, during the time slot for the LE1–LO1 line pair, there is still no signal on line LE1 (FIG. 1) and the signal level on line LO1 has increased to the point that it results in the threshold detector 2 (FIG. 1) generating amplitude code $N_{L1}$ that equals or exceeds a stored level code $S_0$ (FIG. 4B), the status of line LO1 becomes the operate time state OT and the status of line LE1 remains IDLEE (FIG. 4C). The level $S_0$ in FIG. 4B represents the level which signal amplitude on an LO line must be before echo suppression can be activated. Signals with amplitudes lower than this level are not of sufficient magnitude to produce objectional echoes.

The OT state (FIG. 4B) is a second idle state for line LO1. This state is provided to minimize the effect of noise bursts on the operation of the echo suppressor. Once the OT state has been assigned as the status of line LO1, it remains that line's assigned status until the increased input signal on the line has produced an output amplitude code $N_{L1}$ from the threshold detector 2 (FIG. 1) such that $N_{L1} \geqslant S_0$ for every sample of the line during an interval equal to T1. The interval T1 is chosen such that if the code $N_{L1}$ produced by signal samples of line LO1 satisfy the condition $N_{L1} \geqslant S_0$ during the interval, it is likely that the signal on the line is not due to a burst of noise. This mode of operation keeps echo suppression from being activated until it is established that the signal giving rise to the OT state being assigned to the line is, in all probability, not noise. On the other hand, if any sample of the line LO1 yields an amplitude code $N_{L1} < S_0$ during the OT state, that state is replaced with the IDLEO state as the assigned status of the line. The status of the echo suppressor is changed to IDLEO status for the above condition because it is likely that a signal level on line LO1 that drops below the level represented by the stored code $S_0$ during the interval T1 is, in all probability, noise.

If, as assumed, the signal on line LO1 (FIG. 1) is not noise, the OT state will remain the assigned status of the line for the interval T1. When the interval T1 expires, the ODD state will replace OT as the assigned status of line LO1. This change of status is accomplished by replacing the OT code "01" in the LO1 location of the odd status store 11 (FIG. 2) with the "10" which represents the ODD status. The ODD status is a nonidle or active line status. Consequently, replacing the OT status with the ODD status as the assigned status of line LO1 will result in the suppression signal logic 12 (FIG. 1) generating a signal I that operates the switch 19 to activate echo suppression for the line LO1 if, as assumed, there is no intelligence being transmitted on the line LE1 associated with line LO1. This condition satisfies the requirements of equation (1).

Once the assigned status for line LO1 becomes the ODD status (FIG. 4B), the amplitude code $N_{L1}$ produced by samples of that line are compared with a variable level code $O_{L1}$ stored in a location of the odd level store 20 (FIG. 2) allocated for line LO1 to determine if the assigned status of the line requires alteration. The stored level code $O_{L1}$ is altered in such a manner that it represents a stretched version of the signal levels sampled on the line LO1. This statistical stretching of the line LO1 signal samples, which represents a stretching of the signal envelope on the line, is necessary to compensate for the uncertainty of the time delay in the echo path. In essence, this stretching of the signal envelope ensures that echo suppression will not be deactivated before the echo signals have had time to traverse the echo path. The stored level code $O_{L1}$ is varied as a function of the past signal levels sampled on the line LO1 and time, and is stored in the odd level store 20 (FIG. 2) of the odd threshold control 4 (FIG. 1). It will be noted that the level code $O_{L1}$, representing the stretched envelope on the line LO1 is also compared with the line LE1 sample by the comparator 5 (FIG. 1).

The alteration of the level code $O_{L1}$ to stretch the sampled signal envelope on line LO1 is accomplished as follows. When the assigned status of the line LO1 is IDLEO (FIG. 3) and the odd threshold detector 2 (FIG. 1) generates an amplitude code $N_{L1} \geqslant S_0$ for a sample of the line, the level code $O_{L1}$, which at this time is zero, is incremented by one. In essence, when the assigned status of line LO1 is IDLEO and the sampled signal level on that line produces an amplitude code $N_{L1}$ that is greater than or equal to $S_0$, where $S_0$ represents the minimum amplitude at which echo suppression may be activated, the stored level code $O_{L1}$ associated with line LO1 is incremented by one. This incrementing records the occurrence of a signal level on the line that exceeds the $S_0$ threshold value. Similarly, if samples of line LO1 produce amplitude codes $N_{L1}$ that exceed the value of the stored level code OL1 during the time any one of the OT, ODD, and OHO statuses is assigned to as the status of the line, $O_{L1}$ will also be incremented. The existing value of the stored code $O_{L1}$ will be decremented by one when the hangover status OHO has to be assigned to the line LO1 for an interval $T_k$ during which no sample of the line exceeds the existing value. This decrementing produces a decrease in the stretched signal level represented by the stored level code $O_{L1}$ after amplitudes of signals being received on line LO1 have been at the decreased level for the interval $T_k$. Decrementing of the stored level code $O_{L1}$ will continue, for the given conditions, until it equals zero at which time the assigned status of the line LO1 will again be IDLEO.

In view of the foregoing discussion of the alteration of the stored level code $O_{L1}$, it is now possible to complete the discussion of state assignment for the line LO1 as shown in FIG. 4B. It will be recalled that line LO1 had been assigned the active line status ODD as its status due to the signal levels being received on that line. As previously pointed out, the signal level code $O_{L1}$ stored in a location of the odd level store 20 (FIG. 2) associated with line LO1 will also have been incremented to some value. The status of line LO1 will remain unchanged if the incoming samples on the line remain greater than or equal to the value of $O_{L1}$ at the time they are received. Furthermore, each sample that produces an amplitude code $N_{L1}$ that exceeds the stored value $O_{L1}$ results in $O_{L1}$ being incremented by one up to a selected maximum value.

When there is a decrease in the signal level on line LO1 such that the resulting amplitude code $N_{L1} > O_{L1}$, the assigned status of the line is changed from ODD (FIG. 4B) to the OHO hangover status. The change in status of line LO1 is accomplished by replacing the "10" ODD code in the line LO1 location of the odd status store 11 (FIG. 2) with the "11" OHO code. The OHO status, like the ODD status, is an active odd line status. It is provided to bridge any temporary decreases in the signals being received on the line LO1. This mode of operation bridges temporary nulls in speech signals. After the OHO status has been assigned to the line LO1, due to a null in the received signal, the stored level code $O_{L1}$ will still be incremented if the signal level on the line LO1 increases again to a point that samples of the line produce an amplitude code $N_{L1} > O_{L1}$ (FIG. 3). If this condition or $N_{L1} = O_{L1}$ occurs, the status of line LO1 is changed from OHO to ODD (FIG. 4B). In other words, the increase in signal level on the line results in the hangover status of the line being replaced by the ODD status.

On the other hand, if the signal level $N_{L1}$ (FIG. 4B) on the line LO1 remains less than the stored level code $O_{L1}$, the line's status will remain OHO for an interval equal to $T_k$. Upon the expiration of this interval, the value $O_{L1}$ is decremented by one (FIG. 3) and the ODD status replaces the OHO status for line LO1 (FIG. 4B). In essence, the level on the line LO1 remaining below the stored level code $O_{L1}$ for an interval equal to $T_k$ is interpreted as indicating the possibility that there are no longer speech signals on the line. To determine this, the stored level code $O_{L1}$ is decremented by one and the status of the line becomes the ODD status. If signal level on the line is less than the decremented value of the stored level code $O_{L1}$, the OHO status will replace the ODD status as the line status on the next sample of the line and the above operations will be repeated. This mode of operation will continue, where the signal level on the line remains below the value of the stored level code $O_{L1}$, until $O_{L1}$ has been decremented to a value such that $O_{L1}$=1. After the stored level code $O_{L1}$ for line LO1 has remained equal to one for an interval $T_k$ during the hangover state OHO, due to the low signal level on the line, the IDLEO status replaces the OHO status as the assigned status of line LO1.

Since the IDLEO is an inactive odd line status, this alteration in the assigned status deactivates line LO1 echo suppression. When the assigned status of line LO1 is an inactive odd line status, Equation (1) is no longer satisfied and there will be an output from the suppression signal logic 12 (FIG. 1) that results in a signal R being applied to the switch 19 in the time slot for the line LE1–LO1 pair. The application of this signal operates the switch and deactivates echo suppression for the line pair. In essence, the existence of the condition $(N_{L1}<O_{L1})\cdot(O_{L1}=1)$ for the interval $T_k$ during the hangover state of line LO1, indicates that the line, in all probability, is no longer carrying information and, therefore, no longer requires echo suppression. In essence, this condition indicates that the signal level on the line LO1 has been low enough for a sufficient interval that no echo suppression is required.

The state diagram in FIG. 4B, interpreted in conjunction with the table shown in FIG. 3, may be thought of as one way of implementing a probability distribution, where the probability is a function of signal amplitude and signal duration. That is, when line LO1 has been idle and a signal of sufficient amplitude to generate echo signals appears on it, it is ultimately assigned one of two active line statuses. This status is determined by the amplitude and the duration of the signal present on the line.

The higher the signal amplitude and the greater its duration, the longer the state assigned to line LO1 will be an active state after the signal on that line terminates. Conceptually, this is based on the fact that there is a high probability of high amplitude, long duration signals being information bearing signals that will continue to exist a significant length of time. Therefore, it would be inadvisable to deactivate echo suppression every time there was a decrease in the amplitude in one of these signals. On the other hand, by varying the amount of time a line is assigned an active line status after the signal level on the line decreases, as a function of the signal amplitude and duration, the amount of time echo suppression is activated when not needed is minimized. The upper and lower bounds of the time intervals involved are similar to those used in prior art echo suppression.

The above has shown how the activity status assigned to any odd line LOn in a 2-way transmission system is determined on the basis of the signal amplitude present on that line during successive samples. While the discussion was in terms of only one odd line LO1 (FIG. 1), it is obvious that the same steps would be performed for each odd line in a system having *n* line pairs as each line pair is repetitively sampled.

As was noted earlier, echo suppression is accomplished by inserting a digital attenuator in series with the transmitting or, alternatively, the even line which precludes any transmission over the line. Therefore, it is desirable to activate echo suppression only when there is no signal being transmitted on the even line and the signal on the odd line is of sufficient amplitude to generate echo signals. Consequently, in addition to determining the activity status of an odd line in the manner indicated in FIGS. 3 and 4B, it is also necessary to determine if information is being transmitted on the even line associated with the odd line. This determination is made by comparing the signal amplitude present on the even line $LE_i$ of the $LE_i$–LO line pair with the stored level code $O_{Li}$ in the location of the odd level store 20 (FIG. 2) allocated for the line $LO_i$ at the time the lines are concurrently sampled. If the signal amplitude on the even line is greater than the signal amplitude represented by the stored level code $O_{Li}$ for the odd line, it is assumed that the information is being transmitted on the even line, or alternatively, it is active, and echo suppression should not be activated. It will be recalled that the variable stored level code is used to stretch the envelope of the signal on the $LO_i$ line. Hence, the comparison consists of comparing a sampled signal level on the even line LE1 with a signal level determined by the stretched envelope on the odd line LO1. This mode of operation eliminates activation of echo suppression as a result of spurious noise signals occurring on the odd line while information is being transmitted on the even line.

The method of insuring that a transmission on an even line is not interrupted due to spurious noise signals on its associated odd line is shown graphically in FIG. 4C. The state diagram shown there is also based on signal level statistics of the kind previously mentioned. The signal AE in FIG. 4C is an active signal generated when the signal amplitude on an even line is greater than a signal amplitude determined by the stretched signal envelope on its associated odd line. The generation of this signal is used as an indication that information is being transmitted over the even line and echo suppression should not be activated.

Referring to FIG. 4C, if the sampled even line, such as line LE1 (FIG. 1), has been idle in the past and the signal amplitude on it rises to a level exceeding the stored code $O_{L1}$ representing a signal envelope level on line LO1 (FIG. 1), AE is generated and the state assigned to the even line changes from IDLEE (FIG. 4C) to DHO. In other words, after the generation of the signal AE, the assigned status of line LE1 is no longer idle and the conditions required by Equation (1) above are no longer true. Consequently, echo suppression cannot be activated, or if it is already activated, it will be deactivated.

The purpose of the DHO state, or deferred hangover state, in FIG. 4C, is similar to that of the OT state (FIG. 4B) for the odd line described above. It insures that if the assigned state of line LE1 changes to DHO as a result of a burst of noise, the time the resulting DHO state exists will be minimized. The reason for this is as follows. If conditions require echo suppression when the noise occurs on the line LE1 (FIG. 1), it is desirable to rapidly reactivate echo suppression in order to eliminate any echo signals being generated by signals being received on line LO1. By making the first active state DHO assigned to an even line relatively short in duration, i.e., less than full hangover is provided in the DHO state, the adverse effects of the noise on echo suppression are minimized.

More specifically, the IDLEE status (FIG. 4C) assigned to the even line LE1 (FIG. 1) is replaced by the DHO state when the signal AE is generated. Physically, this is accomplished by replacing the code "00," representing the IDLEE state (FIG. 4C), stored in a selected location of the even status store 10 (FIG. 1) with the code "01" which represents the DHO state. If, after this change of state has occurred, AE is not generated on any sample of line LE1 for an interval whose expiration is represented by the generation of timing signal T'O, the state of line LE1 again becomes the IDLEE state. Thus, it is clear that the interval represented by T'O is the maximum time the state of line LE1 will remain active after the occurrence of a burst of noise.

On the other hand, if the signal on line LE1 is of such an amplitude that the signal AE is generated on every sample of the line for an interval whose expiration is represented by the timing signal T'1 (FIG. 4C), the DHO code "01" in the even status store 10 (FIG. 1) is replaced by the E code "10". The E state (FIG. 4C) being assigned to line LE1 is taken as an indication that there is a high probability of the signal on line LE1 being an information bearing signal such as speech. Consequently, it is desirable to delay the activation of echo suppression for a selected interval upon the occurrence of a null in the line LE1 (FIG. 1) signal in order to avoid interfering with the signal being transmitted on the line. The duration of the selected interval is dependent upon the type of signal transmitted and the statistical characteristics of the signal. As mentioned above, these characteristics may be thought of as a probability distribution based on signal amplitude and duration.

The desired delay in echo suppression activation is achieved by providing a full hangover state for line LE1 when the signal level on it decreases. In other words, if during the time line LE1 is assigned the active state E, the signal level on it drops below the level of $O_{L1}$ and the signal AE is not generated for a sampling of the line pair, the state assigned to line LE1 is changed to the EH, or hangover state (FIG. 4C). This change is represented by replacing the code "10" (FIG. 4C) representing the E state, in the location allocated to line LE1 in the status store 10 (FIG. 1) with the code "11" representing EH, the hangover state.

The hangover state EH (FIG. 4C) is also an active even line status and as long as it is the assigned status of line LE1, echo suppression cannot be activated since the requirements of Equation (1) are not satisfied. If the signal level on line LE1 increases sufficiently to generate the signal AE while the line's assigned status is EH, and the signal is generated for every sampling of the associated line pair for an interval whose expiration is represented by the generation of T'O, the assigned status of line LE1 will again become the E state.

Practically, this represents the situation where there is only a temporary null in the information signal being transmitted on line LE1. Thus, a temporary null in the information signal merely results in the assigned active state of the line temporarily changing from the E (FIG. 4C) state to the EH state. The line's assigned status again becomes the E state once the signal on the line returns to a level sufficient to generate the signal AE and remains there for a selected interval. As was indicated above, this hangover is provided to avoid the activation of echo suppression while an information signal is being transmitted on line LE1 as a result of a temporary decrease in the information signal's amplitude.

On the other hand, if the signal level on line LE1 remains below that level represented by the stored level code $O_{L1}$ for the odd line LO1, resulting in the signal AE not being generated in any time slot of the LO1–LE1 line pair during the interval whose expiration is represented by the generation of T'2, the IDLEE state will replace the EH state as the assigned state of line LE1. That is, if the signal level on line LE1 remains below the stored level code $O_{L1}$ representing a signal level in the stretched envelope on line LO1 for an interval T'2, there is a high probability that information is no longer being transmitted on line LE1. Here again, the duration of the interval represented T'2 depends on the type of signal being transmitted and its statistical amplitude characteristics. Once the state assigned to line LE1 is again the IDLEE state (FIG. 4C), echo suppression may be activated if line LO1 has an active state assigned to it since this combination of state assignments satisfies the requirements of Equation (1).

The above discussion may be summarized as follows: Coded signals generated by a plurality of line pairs are introduced directly into common control circuitry in their respective time slots. The common circuitry initially utilizes these signals to determine whether or not information is being transmitted over the even line of an associated pair. If so, then echo suppression is not activated. However, if the even line is idle, the next step is to determine if information is being received on the odd line. If the odd line of the associated pair is idle, there is no need for echo suppression and it is not activated. On the other hand, where the odd line is active and the even line is idle, the possibility of echo signals being generated exists. Consequently, as indicated in Equation (1) above, echo suppression is activated when the odd line in a pair is active and the even line is idle. Conversely, when the even line becomes active, or the odd line becomes idle, echo suppression will not be activated or, if it is activated at this time, it will be deactivated after the expiration of a selected interval.

DETAILED DESCRIPTION OF THE SYSTEM

A system operating in the manner generally described above is shown in FIG. 1. While the system is intended to service a plurality of line pairs, its operation may be completely and clearly described, with a minimum of repetition, using only one pair of lines.

Referring to FIG. 1, an embodiment of the invention is shown that is useful in conjunction with multiplexed data transmission systems which transmit signal amplitudes in the forms of codes. More specifically, the FIG. 1 embodiment is especially useful in conjunction with pulse code modulation systems. An echo suppressor of this type allows the multiplexed pcm code outputs of the data transmission system to be used in providing echo suppression.

Figure 7:
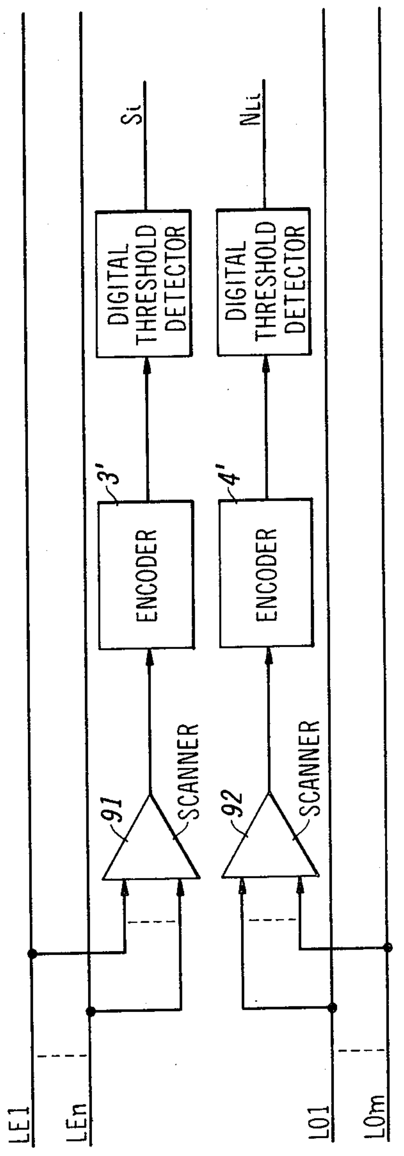
FIG. 7 shows a circuit arrangement to be used when digital echo suppression is to be provided by connecting the echo suppressor directly to transmission lines in a system transmitting analogue signals.

The FIG. 1 embodiment may also be modified as shown in FIG. 7. In this embodiment of the invention, the analogue signals on the transmission lines are applied to scanners. The signals on the even lines are applied to one scanner 91 (FIG. 7) and the signals on the odd lines are applied to another scanner 92. These scanners operate synchronously so that the signals on a line pair such as LE1–LO1 are simultaneously introduced directly into the common control in a selected time slot. This embodiment eliminates the need for providing data coders 86 and 86' (FIG. 6) and decoders 81 and 88' in the transmission paths of a transmission system. The outputs of the scanners 91 and 92 (FIG. 7) are applied to encoders 3' and 4' (FIG. 7) respectively. These encoders 3' and 4' translate the sampled analogue signal levels into pulse codes which are applied to the digital threshold detectors 1 and 2 respectively. These threshold detectors are the same circuits as detectors 1 and 2 in FIG. 1. From this point on, the operation is the same as the operation of the embodiment shown in FIG. 1 which will be described in the following discussion.

FIG. 1 shows lines LE1–LEn connected to a data coder 3. This coder 3 repetitively samples these lines and generates a pulse code representing the signal amplitude on each line as the line is sampled. The bits comprising the pulse code are transmitted from the output of the coder 3 over line LE in parallel and are applied to the switch 19 and the common time-shared digital threshold detector 1. The path just described will be referred to as the transmitting path and the lines LE1–LEn will be referred to as the transmitting, or alternatively, the even lines. The data coder 3 may be any one of numerous well known pcm coders. The signals on the line LO are also parallel bits comprising a pcm code representing the amplitude of a signal on a line $LO_i$ (FIG. 6) at the west terminal. This code is generated by the coder 86' (FIG. 6). It will be noted that the code signals on the LO line (FIG. 1) are applied to the time-shared digital threshold detector 2 (FIG. 1). This path will be referred to as the receiving path and the lines LO1–LOn (FIG. 6) will be referred to as the receiving lines, or alternatively, the odd lines.

The digital threshold detector 1 in FIG. 1 is used to convert the pcm encoded peak amplitude of the signals sampled on a line $LE_i$ into a 4-bit amplitude code in the time slot for that line. An illustrative example of a similar detector is disclosed in the copending application of C. J. May, Jr., Ser. No. 69,752, filed Sept. 4, 1970. This detector operates in the following manner. The pcm codes representing samples of the signal levels on a given line $LE_i$ occur at some multiple of the rate that the common control time slot occurs for the line. For example, *r* codes representing *r* samples may appear on line LE1 for each occurrence of the common control time slot for LE1. The threshold detector 1 has two functions. The first is to approximate, between selected upper and lower limits, the peak value of the signal envelope on line LE1 producing the *r* codes from the occurrence of these codes in the interval between common control time slot occurrences for line LE1. In essence, this approximation compresses a pcm code group consisting of, for example, eight bits into a 4-bit code that can represent sixteen discrete signal levels in an amplitude range that is meaningful in supplying echo suppression. The second function of the threshold detector is to use this approximation to generate an amplitude code during the common control time slot for line LE1. The operation of threshold detector 2 is the same as threshold detector 1 except that the former serves pcm codes generated by signals appearing on the LO1–$LO_n$ (FIG. 6) lines.

One type of threshold detector suitable for use in the system operates in the following manner. When the first of the $r$ codes generated between common control time slots for line LE1 occurs, its absolute value is compared with a stored code representing past codes generated on line LE1. The common control time slots are identified by the application of timing pulses SC (FIG. 1) that are synchronized with the common control timing and applied to the threshold detectors. If the absolute value of the new code represents a signal level within the range of amplitudes capable of producing echos and the code is greater than the stored code, the absolute value of the new code replaces the stored code. This reflects the increase in the magnitude of the envelope amplitude of a signal capable of producing echos. This same operation will be repeated for the remaining $r-1$ codes generated by the signals on line LE1, if each successive code represents an envelope amplitude having a greater magnitude than that represented by the preceding codes. In other words, if the magnitude of the signal envelope being sampled and encoded on line LE1 continuously increases in the interval under discussion, the LE1 code stored in the threshold detector will be changed on each sample of the envelope to reflect this increase. On the other hand if the magnitude of the envelope amplitude has decreased from what it had previously been, the absolute value of the lower value code occurring after the decrease has continuously existed for every sample of the line for a selected interval will replace the stored code. This operation reflects the decrease in the magnitude of the signal peak amplitude. The foregoing operation will be repeated until the decreasing signal amplitude drops and remains below the lowest amplitude of the selected range of amplitudes being encoded. This latter condition is represented by a zero code output from the detector 1 (FIG. 1). When the common control time slot for line $LE_1$ occurs, the amplitude code associated with it in the threshold detector is available at the output of the threshold detector 1 (FIG. 1).

A more detailed description of the digital threshold detector circuit is presented in the following discussion. In this discussion it is assumed that the signal levels being discussed are all within the selected amplitude range previously mentioned. When the data coder 3' (FIG. 8) samples line $LE_i$, the code $C_i$ is generated and applied to the comparator 101 during the $i^{th}$ transmission system time slot. Simultaneously, the stored code $S_i$, associated with line $LE_i$, is available at the output of the code store 102 and this code is also applied to the comparator 101 as a second input. Additionally, the code $S_i$, which constitutes the 4-bit amplitude code output of the threshold detector 1 (FIG. 1), is applied to the signal level comparator 5 (FIG. 1) in the common control circuitry if the $i^{th}$ common control time slot occurs at this time. The code store 102 operates in synchronism with the data coder 3' and may be comprised of recirculating acoustical delay lines. The comparator 101 compares the two codes, ignoring the sign of the code $C_i$, to determine the relationship between them.

If $|C_i| > S_i$, representing an increase in signal level magnitude on line $LE_i$, the comparator 101 generates a write signal W that is applied to the write logic 104 (FIG. 8) along with $|C_i|$. The application of the signal W to the write logic 104 results in $|C_i|=S_{i2}$ replacing $S_i$ in the memory location of the amplitude code store 102 allocated for line $LE_i$. In effect, this operation associates the new higher valued stored code $S_{i2}$ with line $LE_i$ to indicate the signal level magnitude increase on the line. Furthermore, the signal W is also applied to the timing logic 106 and results in the location of the timing code store 107 associated with line $LE_i$ being cleared. Upon completion of these operations, the detector is ready to process the code $C_{i+1}$ which is generated when line $LE_{i+1}$ is sampled during the next time slot. The timing code store 107, like the amplitude code store 102, may be a recirculating store that operates in synchronism with the transmission system 108. The foregoing operations are always performed when the absolute value of code $C_i$ represents a signal level magnitude that is greater than the magnitude represented by the stored code $S_i$.

The newly stored code $S_{i2}$ will remain in the amplitude code store 102 until the magnitude of the signal level on line $LE_i$ increases above, or decreases below, the level represented by that code. If the signal level magnitude increases, $S_{i2}$ will be replaced in the same manner described above. On the other hand, if the signal level magnitude decreases, the stored code $S_{i2}$ will be replaced only after this decreased magnitude has existed a selected interval M.

Figure 8:
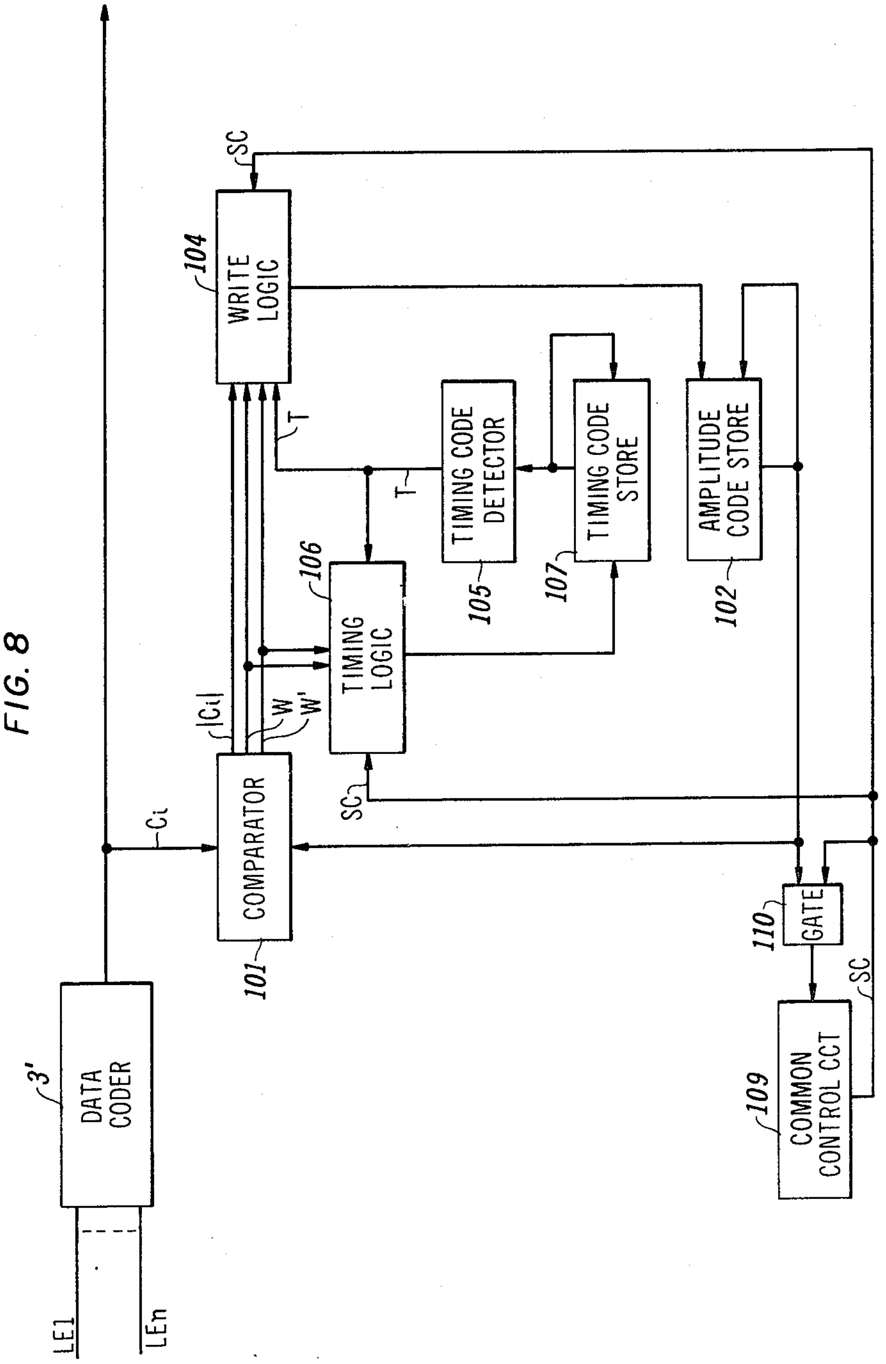
FIG. 8 shows a block diagram of the digital threshold detector circuitry in FIG. 1 that is useful in the detailed description of the echo suppressor.

Assuming that on the next sample of line $LE_i$ the signal level magnitude on the line has decreased to a level such that the absolute value of the code $C_i$ generated when the line is sampled is less than the stored code $S_{i2}$ associated with the line, the digital threshold detector operates as follows. During the $i^{th}$ time slot, the code $C_i$ and the stored code $S_{i2}$ are applied to the comparator 101 (FIG. 8). Simultaneously, the stored code $S_{i2}$ is also applied to the output gate 110 which is not enabled at this time. Since $|C_i|<S_{i2}$ the comparator 101 will generate the signal W' which is applied to the timing logic 106 and results in the contents of the memory location in the timing code store 107 allocated for storing the timing code $TS_i$ for line $LE_i$ being incremented by one. There will be no output from the timing code detector 105 since the stored timing code $TS_i$ is not equal to the value M. The value M indicates that the level on line $LE_i$ has been less than the level represented by the stored code $S_{i2}$ long enough to warrant replacing $S_{i2}$. After the stored timing code $TS_i$ has been incremented, the threshold detector begins processing the code $S_{i+1}$ generated by the sampling of line $LE_{i+1}$ in the $(i+1)^{th}$ time slot of the transmission system.

The above operations will be repeated for every sample of line $LE_i$ while the magnitude of the amplitude level on it remains less than the magnitude represented by the stored code $S_{i2}$ and the stored timing code $TS_i$ will continue to be incremented. Finally, a point will be reached where the application of the absolute value of $C_i$ and the stored code $S_{i2}$ will generate the signal W', indicating $|C_i|<S_{i2}$, and the stored timing code $TS_i$ will be equal to M. The condition $TS_i=M$ will result in the timing code detector 105 (FIG. 8) generating the signal T which is applied to the write logic 104 and the timing logic 106.

The generation of the signals W' and T is not, in itself, sufficient to result in the stored $S_{i2}$ being replaced with the new code $|C_i|=S_{i3}$ to reflect the decreased signal level magnitude on the $LE_i$ line. In the absence of the common control time slot signal SC (FIG. 8) for line $LE_i$, indicating that the common control circuitry 109 requires the amplitude code for line $LE_i$, the stored code $S_{i2}$ remains unaltered in the location of the amplitude code store 102 allocated for the line. In this situation, the foregoing steps, with the exception of the incrementing of $TS_i$, are repeated for each sample of the line $LE_i$ until the common control circuitry 109 generates the common control time slot signal SC during the $i^{th}$ time slot. During these samples of line $LE_i$, the comparator 101 will continue to generate the W' since the magnitude of the signal level on the line remains at a level lower than the magnitude represented by the stored code $S_{i2}$. Similarly, the existence of the signal T disables the timing logic during the $i^{th}$ time slot and the stored timing code $TS_i=M$ of line $LE_i$ remains unaltered.

When the line $LE_i$ common control time slot signal SC (FIG. 8) occurs, indicating that the common control circuitry 109 requires the amplitude code for line $LE_i$, and the signals W' and T exist, the write logic 104 will be enabled. This enabling of the write logic 104 results in the stored code $S_{i2}$ being replaced with the new stored code $|C_i|=S_{i3}$ to reflect the reduced magnitude of the signal level on line $LE_i$. Additionally, the signal SC enables the gate 110 and the stored amplitude code $S_{i2}$ is applied to the common control circuitry. The replacement of the stored code is accomplished after the stored code $S_{i2}$ has been applied to the common control circuitry. Similarly, the concurrent existence of the signals SC,W' and T also result in the timing logic 106 clearing the location in the timing code store 107 which contains $TS_i=M$. This operation initializes the timing code for line $LE_i$ which will be altered on future samples of the line.

The replacement of the code $S_{i2}$ is postponed until after it has been applied to the common control 109 (FIG. 8) to obtain a more accurate approximation of the changing signal level on the line $LE_i$ for the common control. By postponing the replacement in this manner, the threshold detector has several samples of the line $LE_i$, after $S_{i3}$ replaces $S_{i2}$, in which to stabilize the stored code associated with the line before the stored code is again used by the common control 109. In essence, this mode of operation bridges transitions in signal levels and provides a more nearly correct approximation of the peak signal level on a line.

The foregoing has described the operation of the digital threshold detectors 1 and 2 (FIG. 1). In summary, each of these detectors compress the pcm codes applied to them into a 4-bit code used to represent 16 discrete amplitude levels in the range of amplitudes capable of producing echos. The 4-bit code is varied in such a way that it approximates the peak signal level of the applied signal envelope falling within the selected amplitude range. An illustrative example of such a range would have its lowest level at −31dbm with each of the higher levels being separated by a 3dbm difference. The outputs of these detectors 1 and 2 (FIG. 1) are applied to the comparator 5 and the odd threshold control 4 (FIG. 1), respectively, in the common control time slots as amPlitude inputs and they are used in determining if echo suppression is required by the signal amplitude being received on a given odd line.

For purposes of describing the echo suppressor response to varying signal levels on a given line pair, assume that both lines LE1 (FIG. 1) and LO1 (FIG. 6) have been idle. Further assume that upon the occurrence of the common control time slot for the line pair, or the current sample, the signal level on line LE1 (FIG. 1) being transmitted by code on line LE remains insufficient to result in an output from detector 1 and the signal level being transmitted on line LO1 (FIG. 6) has risen, resulting in a higher pcm code on line LO (FIG. 1), and this code is sufficient to generate the maximum signal level code output from the LO1 detector 2. In other words, this assumes that information of a high amplitude is being received from line LO1 and no information is being transmitted on line LE1. Referring to Equation (1), this condition of line LE1 being idle and line LO1 being active satisfies the requirements for the activation of echo suppression.

Since both lines have been idle prior to this sampling, the even status store 10 (FIG. 1) contains the code "00" (FIG. 4C) in the location allocated for the status code of line LE1 indicating that this line has not been transmitting information. Similarly, the odd status store 11 (FIG. 2), which is a part of the odd threshold control 4 (FIG. 1), also contains the code "00" (FIG. 4B) in the location allocated for the status code of line LO1. Referring to FIGS. 4B and 4C, it will be seen that these are the codes indicating that the odd and even lines have been idle. By using recirculating stores, such as acoustical delay lines, which are synchronized with the occurrence of common control slots SC, it is insured that the status codes assigned to a specific even-odd line pair are always available at the time the amplitude codes for the pair are available at the outputs of their respective threshold controls 1 and 2 (FIG. 1). Two such delay lines are used to construct both the 2-bit even status store 10 (FIG. 1) and the 2-bit odd status store 11 (FIG. 2) which, as previously noted, is a part of the odd threshold control 4 (FIG. 1).

Returning to FIG. 1, there will be no code signal on the output line of the LE1 detector 1 at the time of common control sampling since the low energy signal being transmitted by pulse code on the line LE has resulted in the storage of an amplitude code for LE1 in the threshold detector that is equal to zero. However, the signal energy level being received on line LO1 (FIG. 6) has become sufficient to generate higher value pcm codes. These higher valued pcm codes are transmitted over the line LO and result in a selected non-zero four-bit amplitude code being stored in a location of the threshold detector amplitude code store 102 (FIG. 8) associated with the line LO1. Upon the occurrence of the common control time slot SC for that line, the code is available at the output of the LO detector 2.

At the time of the sampling or, alternatively, in the common control time slot allocated for the line pair LE1–LO1 (FIG. 1), the amplitude code signals in the threshold detectors 1 and 2 representing peak signal levels on the two lines are simultaneously applied to the signal level comparator 5 and the odd threshold control 4, respectively. The application of the amplitude code from the LO detector 2, representing the approximated peak value of the signal on line L01, to the odd threshold control 4 results in the stored level code $O_{L1}$ in the location of the odd level store 20 (FIG. 2) being increased. It will be recalled from the discussion of FIGS. 3 and 4B that the stored level code $O_{L1}$ represents the stretched version of the signal envelope on the line LO1. The level comparator 5 (FIG. 1) compares the amplitude code from the LE detector 1, representing the approximated peak signal level code for line LE1, with the odd line stored level code $O_{L1}$ representing the stretched signal envelope on line L01. If the comparison of the two codes indicates that the peak signal being transmitted on line LE1 is greater than that on line LO1, a signal AE is generated by the comparator.

This signal AE (FIG. 1) is the same signal as the active signal AE discussed above in conjunction with the state diagram shown in FIG. 4C. However, since it has been assumed that the signal amplitude being transmitted on line LE1 is less than that being received on line LO1 at the time of this sample, no AE signal will be generated for this comparison. Referring to FIG. 4C, this means that the IDLEE state represented by the code "00", is stored in the location of the even status store 10 (FIG. 1) allocated for line LE1, will remain unchanged for this sample. In other words, line LE1 is still idle during this sample and its status code will remain "00" to correctly indicate this fact the next time the line is sampled.

The odd threshold control 4 (FIG. 1) is used to assign the activity status of the odd line L01 in addition to providing an odd signal level code $O_{L1}$ representing the stretched envelope on the line. A detailed block diagram of the odd threshold control is shown in FIG. 2. The odd threshold control 4 (FIG. 1) determines the status code that is to be stored in the location of the odd status store 11 (FIG. 2) allocated for the line LO1 in accordance with the conditions set forth in FIGS. 3 and 4B. Since the signal being received on line L01 is sufficient to generate an amplitude code $N_{L1}$ that exceeds the value $S_{01}$, where $S_0$ is the level at which signals on an odd line are of sufficient amplitude to produce echos, the status of line LO1 will be changed from IDLEO to OT (FIG. 4B).

A more detailed understanding of the operation of the odd level control 4 (FIG. 1) is facilitated by referring to FIG. 2. The $N_{L1}$ amplitude code output of the detector 2 (FIG. 1) is applied to the comparator 22 (FIG. 2). The other inputs to the comparator 22 are from the odd level store 20 which is a time divided store that operates in synchronism with the common control time slots and the $S_0$ signal generator 25. At the time the amplitude code $N_{L1}$ is generated as an indication of the signal level on LO1 and applied to the comparator 4, the contents of the memory location in the odd level store 20 (FIG. 2) allocated to that line and the value $S_0$ are also applied to the comParator. Since line LO1 has been idle, its memory location in the odd level store 20 will contain the value zero. Furthermore, it will be recalled that $S_0$ is lowest level on a line that can activate echo suppression. Since the amplitude code $N_{L1}$ generated by the detector 2 (FIG. 1) is the maximum value obtainable, from the detector, the condition $N_{L1}>S_0$ exists and the comparator 22 generates a signal indicating this condition which is applied to the odd status control 11.

The amplitude code $N_{L1}$ and $S_O$ discussed above are the same signals as those shown in FIG. 4B. The signal generated by the comparator 22 indicating that $N_{L1}>S_0$ results in the odd status control replacing IDLEO code "00" (FIG. 4B) in the location of the odd status store 11 (FIG. 2) allocated to line L01 with the OT code "01" as the status of the line. Furthermore, the simultaneous existence of $N_{L1}>S_0$ with IDLEO as the assigned status of line LO1 results in the arithmetic unit 21 incrementing the stored level code $O_{L1}$ in the odd level store location allocated to the line by one and the line L01 location in the timing store 8' is cleared. As described earlier, the incrementing of the stored level code $O_{L1}$ serves the purpose of stretching the signal being received from line LO1.

During the time OT is the assigned status of line LO1 and the signal level on the line remains high enough that $N_{L1}>O_{L1}$ for each sample of the line, the level code $O_{L1}$ stored in the odd level storage location allocated to the line will be incremented one by the arithmetic unit 21 every time the line's common control time slot occurs. Similarly, during the existence of the condition $OT\cdot(N_{L1}>S_0)\cdot G1$, where G1 is a system timing granularity pulse occurring at some submultiple of the sampling rate, the timing code stored in the memory location of the odd timing store 8' allocated for the line LO1 is incremented. Examples of granularity signals appear in FIG. 5 which occur at one-fourth and one-sixth the rate of common control time slots. These granularity signals provide a variable timing rate which allows the use of a minimum length code word for storing the timing codes for both short and long intervals. During the OT state, the line LO1 is processed by the odd status control 9 only when G1 occurs and this is when the line's timing code is incremented. Thus, in the situation being discussed, the stored level code $O_{L1}$ in the odd level store 20 (FIG. 2), representing the stretched envelope on line L01, is incremented every sample of the line L01 and the L01 timing code in the odd timing store 8' is incremented upon each occurrence of a selected multiple of basic line sampling rate of the system.

If the signal level on the line L01 should drop to a level such that $N_{L1}>S_0$ during the 0T state, the odd status control 9 (FIG. 2) would respond to this condition upon its simultaneous existence with the granularity pulse G1 to replace the "01" 0T status code in the odd status store 11 with the "00" IDLEO status code. Similarly, the odd timing unit 8 would respond to the same set of signals to zero the line L01 timing code contained in the timing store 8'. These operations would normally occur where a burst of noise had produced the line L01 change of status.

The foregoing operations continue, as long as the signal level on line L01 remains high, until the L01 timing code in the odd timing store 8' (FIG. 2) has been incremented to a value that results in the generation of the T1 timing signal. In essence, these operations continue as long as the approximated peak level on the line L01 are greater than or equal to the level $S_0$ at which signals on a line are capable of producing echos. When the timing code for the line has been incremented to a selected value, the timing compare 23 generates the T1 timing signal which indicates that the 0T state has been continuously assigned to the line L01 for a selected interval. In addition, the condition $N_{L1} \geq S_0$ exists for this sample of the line since the level on the line is assumed to remain at a constant high level. When these conditions occur simultaneously, the odd status control 9 replaces the 0T status code "01" (FIG. 4B) in the odd status store location allocated for the line L01 with the ODD status code "10" which changes the status of the line from an inactive line status to an active line status. This assignment of an active line status to the line L01 will result in an output from the suppression signal logic 12 (FIG. 1) if IDLEO is the assigned status of the line LE1. This output will result in the generation of the signal I (FIG. 1) which operates the switch 19 to activate echo suppression for the line pair. As previously mentioned, the continuous existence of the 0T state for the selected interval represented by the timing code T1 is an indication that the signal on the line L01 is, in all probability, information as opposed to noise.

On the other hand, if the signal level on line L01 drops or remains at a level below $S_0$, while the line's assigned status is OT (FIG. 4B), IDLEO will replace 0T as the assigned status of the line. For this condition, samples of the line will result in the comparator 22 (FIG. 2) generating a signal indicating that $N_{L1}<S_0$ during the line L01 time slot which results in the odd status control 9 replacing the 0T status code "01" with the IDLEO status code "00" in the location of the status store 11 allocated for the line. In essence, the status of the line is changed to the IDLEO status on the first sample of the line that is processed when the condition $N_{L1}<S_0$ exists simultaneously with the G1 granularity pulse. This mode of operation is produced by a burst of noise on the line.

Since the high signal level on the line L01 has been assumed to be information rather than noise, the assigned status of the line is not changed from 0T to IDLEO but is, instead, changed from 0T to the ODD active line status. This active status is assigned to the line when it is very probable that the signal on the line is an information bearing signal. When the assigned status of line L01 is ODD, (FIG. 4B), the amplitude code output $N_{L1}$ of the detector 2 (FIG. 1), produced by samples of the signal level on the line, is compared with the level code $0_{L1}$ which is stored in the line L01 location of the odd level store 20 (FIG. 2). It will be recalled that $0_{L1}$ represents a stretched version of the signal envelope on the line. During the 0T state this code $0_{L1}$ was incremented, in accordance with FIG. 3, for each sample of the line L01 since each sample of the line during this interval produced a detector 2 (FIG. 1) output $N_{L1}$ which was greater than the stored $0_{L1}$ code.

More particularly, the stored level code $0_{L1}$ is incremented in the following manner. The amplitude codes $N_{L1}$ produced by the samples of the line LO1 are applied to the comparator 22 (FIG. 2) at the same time the store level code $0_{L1}$ is applied to the comparator from the odd level control 20. Since the signal level on the line L01 is extremely high the relation $N_{L1}>0_1$ (FIG. 3) will exist and the comparator 22 (FIG. 2) will generate a signal indicating this condition. The signal is applied to the arithmetic unit 21 and results in the stored level code $0_{L1}$ being incremented by one each time the above condition exists during a time slot for the line $L0_1$. Where the signal on the line is extremely high, as is assumed in this case, the stored level code $O_{L1}$ will be incremented upon each occurrence of the line's common control time slot until the code reaches some maximum allowable value. When this maximum value has been attained the detector 24 generates a signal that inhibits any further incrementing of the stored level code $0_{L1}$. The upper bound may be placed on the value of the stored level code $0_{L1}$ because of storage location capacity, or because once the code has reached a certain value, nothing is gained by further incrementing it even though the signal on line L01 is higher than the level represented by the code, or because of a combination of these reasons.

The ODD status (FIG. 4B) will remain the assigned status of line L01 until the signal level on that line decreases to a point that the amplitude code $N_{L1}$ generated by the detector 2 (FIG. 1) in the common control time slot for the line L01 is less than the stored $0_{L1}$ level code. When this occurs, the comparator 22 (FIG. 2) will not generate a signal indicating that $N_{L1} \geq 0_{L1}$ and the absence of this condition during the ODD state results in the odd status control 9 (FIG. 2) changing the assigned status of the line L01 from the ODD status to the OHO hangover status. This change in status is accomplished by the status control 9 (FIG. 2) replacing the "01" ODD status code in the line L01 location of the status store 11 with the "11" OHO hangover status control. As previously pointed out, this change in status for the line L01 resulting from a decreased signal level on the line provides hangover for bridging the null if it lasts less than a selected interval. The OHO status, like the ODD status, is an active line status and if echo suppression was activated during the time the ODD status was assigned to line L01, it will remain activated during the interval the OHO status is assigned to the line unless the even line LE1 becomes active.

The hangover status OHO (FIG. 4B) will remain the assigned status of the line L01 until either the signal level on the line increases to the point that $N_{L1} \geq 0_{L1}$ or the condition $N_{L1}<0_1$ has existed continuously for a selected interval. If the signal level on the line increases, resulting in the comparator 22 (FIG. 2) generating a signal indicating $N_{L1} \geq 0_{L1}$, the odd status control will change the assigned status of line L01 by replacing the OHO code in the line's location of the odd status store 11 with the ODD status code. After this occurs, the operations performed by the circuitry will be the same as described above when it was assumed that the line's assigned status was the ODD status.

Figure 5:
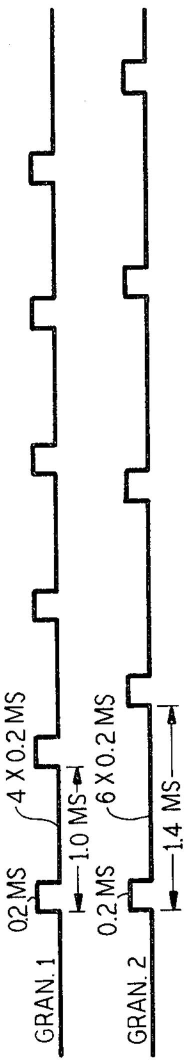
FIG. 5 shows examples of the timing granularity waveforms and is useful in the detailed description of the invention.

On the other hand, if the signal level on the line L01 remains at the level such that $N_{L1}<0_{L1}$ (FIG. 4B) for an interval $T_K$ and the stored level code $0_{L1}$ †1, the ODD status will replace the OHO hangover status as the assigned status of the line. This alteration of status assignment is accompanied by an initialization of the timing code associated with the line. The alteration of the status of the line is performed in the same manner as described above. Simultaneously with this change of status, the condition $(N_{L1}<0_{L1})\cdot(0_{L1}$ † $1)\cdot T_K$ results in the arithmetic unit 21 decrementing the level code $0_{L1}$ stored in the line L01 location of the odd level store 20. During the OHO hangover state, the odd timing unit 8 (FIG. 2) arithmetically alters a stored timing code associated with the line L01 at a submultiple of the line sampling rate determined by the occurrence of the granularity signal G2 (FIG. 5). The interval represented by the TK timing code is considerably longer than the interval represented by the T1 timing code associated with the 0T status. The $0_{L1}$ value detector 24 (FIG. 2A) generates a signal that $0_{L1}$ †1 and this signal, along with presence of the timing signal $T_K$ generated by the timing compare 23 and the absence of the signal $N_{L1} \geq 0_{L1}$ from the comparator 22 enables the arithmetic unit 21 which decrements the level code $0_{L1}$ stored in the location of the odd level store 20 allocated for the line. If the next amplitude code $N_{L1}$ generated by the signal level on line L01, after the decrementing of $0_{L1}$, is such that $N_{L1} \geq 0_{L1}$, the line's assigned status will remain the ODD status. On the other hand, if the next $N_{L1}$ is less than the decremented $0_{L1}$, the status of line L01 again changes from the ODD to the OHO hangover status. As long as the amplitude code $N_{L1}$ generated by the sampling of line L01 remains less than the stored level code $0_{L1}$, the stored level code $0_{L1}$ will be decremented and the status of the line will alternate between OHO and ODD at a rate determined by the occurrence of the timing signal $T_K$ until the stored level code $0_{L1}$ has been decremented to the value one. This mode of operation allows a desirable period of hangover without requiring an excessively large timing store 8' for the odd timing.

When the level code $0_{L1}$ is decremented to one and the signal level on line L01 is still such that it generates an amplitude code $N_{L1}<0_{L1}$, the OHO status will again be assigned as the line L01 status. The assignment of OHO as the status of the line L01 again results in the timing unit 8 incrementing the L01 initialized timing code stored in the odd timing store 8' (FIG. 2). As previously mentioned, when the stored timing code is incremented to a selected value, the timing compare 23 will generate the $T_K$ timing signal. At this same time the comparator 22 generates a signal indicating that the stored level code $0_{L1}$ 1. These two signals are applied to the odd status control 9 which responds by replacing the OHO hangover status code "11" in the line L01 location of the status store 11 with the IDLEO status code "00." In essence, the assigned status of the line L01 is changed from the active hangover status OHO to the IDLEO status which is an inactive status indicating that the signal level on the line is not high enough to warrant echo suppression. This transition of the status of the line L01 deactivates echo suppression.

The foregoing has shown how the odd threshold control 4 operates in accordance with FIGS. 3 and 4B to alter the status assigned to a line L01 as the signal level on that line varies above and below the level at which echos will be produced. This circuitry, shown in detail in FIG. 2, utilizes comparisons between the amplitude code $N_{L1}$ representing an approximated peak value of the signal level on the line, the fixed value $S_0$ representing a signal level capable of producing echos, and the variable stored level code $0_{L1}$ in determining the assigned status of the line and the magnitude of stored level code $0_{L1}$ which represents stretched version of the envelope on the line.

While the foregoing operations are performed by the odd threshold control 4 (FIG. 1), the status control circuitry associated with the line LE1 is simultaneously performing similar operations to determine the assigned status of that line in accordance with FIG. 4C. It will be recalled that the line LE1 has no signal present on it and its assigned status is the IDLEE status (FIG. 4C). The simultaneous existence of the IDLEO state (FIG. 4B) as the assigned status of line L01, and the IDLEE state (FIG. 4C) as the assigned state of line LE1 will not enable the suppression signal logic 12 (FIG. 1). Consequently, the suppression signal logic 12 will not generate a signal during this time slot for the line pair. As a result, the signal R is generated by the line address matrix 17 which operates switch 19 and removes the impedance 18 from the line LE1 transmission path.

Since both members of the line pair are idle, the requirements of Equation (1) are no longer satisfied and echo suppression is, therefore, deactivated. In other words, when the assigned status of line L01 becomes the IDLEO state, this indicates that the signal level being received on that line is of insufficient amplitude to produce echo signals and echo suppression is deactivated.

The above has shown, generally, how the system of FIG. 1 operates in accordance with the state diagram shown in FIG. 4B. It was first shown that when line L01 was carrying a signal with a sufficiently high peak amplitude, and line LE1 was idle, the line L01 had various active status codes assigned to it as indicated in FIG. 4B. These various active status codes assigned to line L01, in conjunction with the idle status code assigned to line LE1, resulted in the attenuator 18 (FIG. 1), in series with the line LE1, being activated to suppress echo signals. Secondly, it was shown that when the signal level being received on line L01 dropped below a selected level, its assigned active status was altered, as a function of time and amplitude, until its assigned state was again the idle state. When the assigned status of the line L01 became the IDLEO state (FIG. 4B) again, the attenuator 18 (FIG. 1) was deactivated and passed the signals on the line LE1 transmission path without altering them since echo suppression was no longer needed.

As pointed out in the discussion of FIG. 4C, the activity status assigned to line LE1 also varies as the amplitude of the signal being transmitted on line LE1 varies. In the discussion of the operation of the system in FIG. 1, describing how it varied the activity status assigned to line L01, it was assumed that line LE1 was idle. Therefore, its assigned status was the IDLEE state (FIG. 4C). However, if the signal level being transmitted on line LE1 rises to a level exceeding the signal level being received on the line L01, the line LE1 will be considered active at the time the common control time slot for the line pair occurs. For this situation, the conditions of Equation (1) are no longer satisfied and echo suppression cannot be activated during the time line LE1 remains active, or echo suppression is deactivated if it has been previously activated. In other words, line LE1 being active means information is being transmitted on it and this information must not be blocked by the insertion of the digital attenuator 18 in its transmission path.

Referring to FIG. 1, the activity status of line LE1 is determined by comparing the approximated peak amplitude $S_1$ of the signal being transmitted on it, generated in the line's time slot by the even threshold detector 1, with the stored level code $0_{L1}$ for the line L01 which is stored in the odd threshold control 4. This comparison is carried out by the comparator 5 each time the time slot for the line pair occurs. If the signal level being transmitted on line LE1 exceeds the stored level code $0_{L1}$ for the line L01, indicating that the line LE1 is active, the comparator 5 generates a signal AE that is applied to the LE status control 6.

At the same time the signal AE is applied to the LE status control 6, the past status code, which is assumed to be the IDLEE code "00" (FIG. 4C), is available from the even status store 10 (FIG. 1) and this code is also applied to the LE status control 6. The even status store 10 is a recirculating store of the same type as the odd status store 11 (FIG. 2) discussed above. It also recirculates the synchronism with the occurrence of common control time slots so that each time the amplitude code $S_1$ and the stored level code $O_{L1}$ appear at the outputs of the detector 1 and the threshold control 4, respectively, for the line pair LE1–LO1, the assigned status of the line LE1 is available.

The concurrent existence of the signal AE and the "00" assigned status code of line LE1 as inputs to the status control 6 (FIG. 1) results in a new status code being stored in the location of the even status store 10 allocated for line LE1. Referring to FIG. 4C, the condition AE·(00) is the condition resulting in the status of line LE1 becoming DHO. Thus, the LE status control 6 responds to the condition AE·(00) by replacing the "00" in the even status store 10 with the code "01." Consequently, the next time the common control time slot for the line pair occurs, the status of the line LE1 will be the DHO state (FIG. 4C) represented by the code "01" in the appropriate location of the even status store 10. It should be noted that the DHO state being assigned to the line LE1 indicates that the line is active and hence, no echo suppression can be activated at this time.

The function of the DHO status (FIG. 4C) is similar to that of the OT state (FIG. 4B) provided for the odd line. That is, it is possible that a burst of noise was the source of codes representing high amplitudes on line LE1. If this is the case, it is desirable to minimize the amount of time line LE1 remains active. As was explained in the discussion of FIG. 4C above, the presence of an incoming signal on the line LO1 may warrant the activation of echo suppression but the active status assigned to line LE1 prevents this activation. Thus, a burst of noise can result in line LE1 being assigned an active status which deactivates echo suppression and allows echo signals to be transmitted on the line. By minimizing the time line LE1 is assigned an active status as a result of noise, the amount of time echo signals are transmitted is also reduced.

If the active status DHO (FIG. 4C) is assigned to line LE1 as a result of noise, succeeding samples of the line will fail to generate the signal AE repetitively. Referring to FIG. 4C, the active status DHO will be changed back to the IDLEE state if the signal amplitude being transmitted on line LE1 drops and remains below a level sufficient to produce the signal AE during the occurrence of all the time slots for the line pair over a period represented by the timing signal T'O (FIG. 4C).

Timing is accomplished by the LE timing unit 7 in FIG. 1. When the DHO state (FIG. 4C) is assigned to line LE1 (FIG. 1) as a result of the generation of the signal AE, the timing unit is enabled. It will arithmetically alter the contents of a timing store 7' location assigned to line LE1 for each of the line's time slots during which the line fails to produce the signal AE. For instance, the timing store location allocated to line LE1 may be decremented for every such occurrence of the line's time slot. When the code contained in the line LE1 location of the timing store 7' (FIG. 1) reaches a preselected value represented by T'O (FIG. 4C), indicating that the prescribed interval has passed without AE being generated again, the T'O timing signal will be applied to the LE status control 6 (FIG. 1) by the timing compare 23'. The condition AE=0, indicating the signal AE is not present, is also logically implied by the signal AE which is the inverse of AE being a "1."

At the same time, the status code "01" (FIG. 4C) assigned to line LE1 will also be applied to the status control 6. This condition, AE·DHO·T'O (FIG. 4C), activates the even status control 6 resulting in the timing unit storage location assigned to line LE1 being cleared and the assigned status code in the status store 10 being changed to "00."

In this manner, the assigned status of the line, which was changed to the active status DHO as a result of noise, becomes the IDLEE state again after the noise has subsided and the signal AE is not generated on any sample of the line LE1 for the interval represented by T'O (FIG. 4C). Here, as in the case of the OT state (FIG. 4B) for the odd line, the interval represented by the signal T'O is a function of the amplitude statistics of the signal being dealt with. Again, the state diagram in FIG. 4C, in essence, represents the various responses of a system whose operation is based on the amplitude statistics of the signals being transmitted on the input lines.

If the signal level on line LE1 represents information, it will remain high enough to generate codes $S_1$ which result in the signal AE being generated by the comparator 5 during each time slot of the line LE1 for an interval represented by the timing signal T'1 (FIG. 4C). Referring to FIG. 1, as has been noted, during the time the DHO state (FIG. 4C) is assigned to the line LE1, the LE timing unit 7 is activated. In the case where signal AE is being generated, the timing store 7' location allocated for the line LE1 may be incremented during every time slot of the line that produces the signal AE. As the signal AE continues to be generated from time slot to time slot of the line LE1, the line's timing code will reach a selected value represented by the signal T'1. When this occurs, the timing compare 23' will generate the timing signal T'1 and the assigned status DHO (FIG. 4C) will be available in the even status store 10. These signals are applied to the LE status control 6 which responds by clearing the location in the timing store 7' assigned to line LE1 and changing the assigned status code in the line's allocated storage location in the even status store 10 to "10" (FIG. 4C). In other words, the assigned status of line LE1 is changed from DHO to E.

Referring to FIG. 4C, the presence of the code "10" in the even status store 10 (FIG. 1) location allocated to line LE1 indicates that the signals being transmitted on the line are in all probability information bearing signals. Consequently, the assigned state E (FIG. 4C), represented by the code "10," is considered the fully active state of the line LE1. This will remain the assigned state of the line until the signal levels being transmitted on it drop below a level sufficient to produce the signal AE.

As mentioned above, information bearing signals fluctuate in amplitude and it is desirable to avoid interrupting a transmission on the line LE1 by activating echo suppression when a temporary null in the signals on the line occur. The hangover state EH (FIG. 4C) is provided to avoid this problem. When the null in the signal level being transmitted on the line LE1 is such that the signal AE (FIG. 1) is not generated by the comparator 5 during a time slot of the line pair, the assigned state of line LE1 becomes the EH hangover state (FIG. 4C). Referring to FIG. 1, the signal $\overline{AE}$ = "1" and the E state code "10" (FIG. 4C), available from the even status store 10 at the time the time slot for the line LE1 occurs, are applied to the LE status control 6 which in turn replaces the "10" code in the status store 10 (FIG. 1) with the code "11." This represents the transition from the E state to the EH hangover state in FIG. 4C.

If the signal amplitude being transmitted on the line LE1 returns to a level sufficient to generate the signal AE again, before the interval represented by T'2 (FIG. 4C) expires, and remains at this level for an interval represented by T'O, the assigned status of the line becomes the E state again. In other words, during the time the line LE1 (FIG. 1) has the EH state (FIG. 4C) assigned to it, the LE timing unit 7 (FIG. 1) is enabled and the location of the timing store 7' allocated for the line is arithmetically altered every time the time slot for the line occurs. When the time slot of the line pair occurs and the timing code for a line LE1 is a selected value, the signal T'O (FIG. 4C) is generated by the timing unit 7. This signal along with the EH code signals "11" (FIG. 4C), which are available in the even status store 10 (FIG. 1), are applied to the LE state detector 6. The condition AE·T'O(11) (FIG. 4C) results in an output from the status control 6 which alters the "11" code in the even status store 10 location allocated for the line LE1 to "10." That is, the assigned state of the line LE1 is changed from the EH state back to the E state.

By providing the hangover state EH (FIG. 4C), which is an active line state, it is insured that a transmission on the line LE1 is not interrupted as a result of a temporary null in the information signal on the line activating echo suppression.

On the other hand, if the signal level on the line LE1 drops, and remains at a level insufficient to generate the signal AE (FIG. 1) for an interval represented by a timing signal T'2 (FIG. 4C), the IDLEE state replaces the EH state as the assigned state of the line. As indicated above, the timing unit 7 (FIG. 1) is activated during the EH state. The storage location of the timing store 7' allocated for line LE1 will be arithmetically altered for each time slot of the line occurring simultaneously with the granularity pulse G2 (FIG. 5) for which no AE signal is generated. This will continue until the line LE1 timing code in the timing store 7' (FIG. 1) reaches a selected value representing the expiration of a selected interval. When this value is reached, the timing unit 7 (FIG. 1) will generate the signal T'2 (FIG. 4C). This timing signal is applied to the status control 6 (FIG. 1). At the same time, the EH state code "11" (FIG. 4C) for the line is available from the even status store 10 (FIG. 1) and it is also applied to the LE status control 6.

The combination of signals $\overline{AE} \cdot T'2 \cdot (11)$ (FIG. 4C) results in the status control 6 generating signals which replace the "11" code in the even status store 10 (FIG. 1) location assigned to line LE1 with the "00" code. As indicated above, this results in the assigned status of the line LE1 being changed from the active hangover state EH (FIG. 4C) to the idle state IDLEE. In other words, the transmitted signal level on line LE1 remaining below a level sufficient to produce the signal AE for an interval represented by T'2 (FIG. 4C) is used as an indication that information is no longer being transmitted on the line. Consequently, the IDLEE state (FIG. 4C) is assigned to the line indicating that the line is idle. This condition allows the activation of echo suppression, via the suppression signal logic 12 (FIG. 1), if the signal level on the L01 has resulted in its being assigned an active line status.

In the case where there is double talking, both the lines LE1 and L01 will be assigned active statuses. As previously pointed out, echo suppression will not be enabled since the requirements of Equation (1) are not satisfied. In this case, the two active statuses present at the suppression logic 12 (FIG. 1) are also applied to the double talk attenuator 8. The simultaneous existence of these two statuses enables the double talk attenuator 8 which attenuates the signal being received on line L01. Since echo suppression is not activated at this time, the attenuation is provided to reduce the amplitude of echo signals produced by the incoming signal.

The above discussion has shown how the system in FIG. 1 operates in accordance with Equation (1), and the state diagrams shown in FIGS. 3, 4B, and 4C, to provide echo suppression for the LE1–L01 line pair. The peak signal levels of the signals being transmitted on the line pair are approximated by the common time-shared threshold detectors 1 and 2 (FIG. 1). Amplitude code signals representing the approximated peak signal levels carried on each line of the LE1–L01 line pair are repetitively generated by the threshold detectors 1 and 2 in the common control time slot for the line pair LE1–L01. The amplitude code signals derived from threshold detector 2, based on the approximated peak signal level on the line L01, are applied to the odd threshold control 4 (FIG. 1). These amplitude codes are applied to a comparator 22 and compared with the stored codes $S_o$ or OL1 which represent the minimum level at which signals on a line are capable of producing echos and a stretched version of the envelope on the line L01, respectively. The results of the comparisons are used to alter the level code $O_{L1}$ as a function of the changing envelope on the line L01. Furthermore, the odd status control 9 (FIG. 2) in the threshold control 4 (FIG. 1) combines these amplitude code signals with code signals from the odd status store 11 (FIG. 2), representing the line's past assigned status, and in some cases, timing signals generated by the L0 timing unit 8 and granularity signals occurring at some submultiple of the occurrence of common control time slots for the line pair. The odd status control 9 responds to these signals according to the state diagram shown in FIG. 4B, changing the assigned status of the line L01 stored in an allocated slot of the odd status store 11 as indicated.

Simultaneously, the amplitude code signals derived from the threshold detector 1, based on the approximated peak signal levels on the line LE1, and the code stored in the odd level store 20 (FIG. 2) which represents a stretched version of the signal envelope on line L01, are applied to a comparator 5 which generates a signal AE if the signal level on the line LE1 is greater than that represented by the stored code associated with line L01. The signals AE and $\overline{AE}$ are used to indicate that either information is being transmitted on line LE1 or the line is idle, respectively. These signals along with the assigned status code of the line LE1 which is available from the even status store 10 in the time slot for the LE1–L01 line pair and, in some cases, timing signals generated by the even timing unit 7 are applied to the LE status control 6. The status control 6 responds to the signals according to the state diagram shown in FIG. 4C, changing the line LE1 status code contained in an allocated slot of the even status store 10 accordingly.

One additional operation occurs simultaneously with those discussed above. As was mentioned, when the time slot for the LE1–L01 line pair occurs, the status code of each line is available in its respective status store. These codes, in addition to being applied to their respective status controls, are also applied to the suppression signal logic 12 (FIG. 1). If the assigned status of the line LE1 is an idle status and the assigned status of the line L01 is an active status, the conditions required by Equation (1) for activating echo suppression are satisfied and a signal is generated.

The signal generated by the suppression signal logic 12 is applied to a line address matrix 17 along with signals from the line address generator 15 which indicate the line pair being served at this time. These inputs result in the address matrix generating a signal I that operates a switch 19. When operated, the switch 19 inserts the attenuator 18 in series with the line LE1 and any signals on that line are suppressed. Conversely, if the assigned status code on the line LE1 is an active status, the address matrix will generate a signal R which results in the attenuator 18 being removed from the line LE1 transmission path. Similarly, the line L01 being idle also results in the signal R being generated. In other words, the line LE1 having an active status assigned to it, or the line L01 having the idle state assigned to it, results in echo suppression being deactivated.

SUMMARY

The foregoing has shown how common time-shared digital circuitry may be used to provide echo suppression in a multiplexed transmission system. In the illustrative embodiment pcm code signals representing amplitudes of analogue signals being transmitted in a multiplexed data transmission system may be applied directly to common time-shared echo suppression circuitry. The system is such that when a pair of lines is sampled and information is being received on the receiving line while, at the same time, no information is being transmitted on the transmitting line, echo suppression is activated by inserting a digital attenuator 18 in series with the transmitting path. Under any other conditions, echo suppression is deactivated.

The determination of whether or not the receiving line is active is made by combining the signal level being received on the line with a statistically determined receive line status code representing past signal levels on the line. The determination of whether or not the transmit line is active is determined by first comparing the signal level being transmitted on it with a variable code representing a stretched version of the signal envelope being received on the receiving line. If the former is greater than the latter, the transmitting line is assumed to be active. The duration of the transmitting line's active state is determined by combining the signals resulting from the comparison of signal levels on the associated line pair with a statistically determined transmit line status code which is a function of past signal levels on the transmit line. The status codes assigned to both the receive and transmit lines are altered as a function of the signal levels on these lines at the time the common control time slot for the pair occurs. Additionally, during the time slot, the assigned status codes of the line pair are combined to control the activation or deactivation of echo suppression.

Echo suppression is activated when the receive line has an active assigned status and the assigned status of the transmit line is the idle status. Any other combination of assigned status codes results in echo suppression being deactivated, if activated at that time, or being maintained inactive if it is not activated.

While the foregoing has dealt, in detail, with only one line pair and the system operation during the time slots for this pair, it is obvious that the system operation is the same for each of a plurality of line pairs during their respective time slots. Discussing a single line pair fully discloses applicants' method and the operation of the system utilized to perform the method, while eliminating the redundancy inherent in a discussion involving a plurality of line pairs. Additionally, it is clear that the system stores, shown as separate entities, could just as well be a single storage unit. Separate stores were used in the illustrative embodiment merely to facilitate describing the system's operation.

Clearly, upon reading the foregoing disclosure, numerous other applications and adaptations, all within the scope and spirit of the invention, will become apparent to one skilled in the art.

What is claimed is:

1. In combination;

means connected to a first line for determining a first digital amplitude code approximating the peak signal amplitude on said first line;

means connected to a second line for determining a second digital amplitude code approximating the peak signal amplitude on said second line; and means responsive to said digital amplitude codes for said first and second lines when said first line is active and said second line is idle for generating an echo suppression enable signal.

2. In combination;

means for translating digital codes representing sampled signal levels on a first line into a first amplitude code representing the peak signal level on said first line;

means for translating digital codes representing sampled signal levels on a second line into a second amplitude code representing the peak signal level on said second line;

means responsive to said first and second amplitude codes for generating a line activity signal when the peak signal level on said second line exceeds the peak signal level on said first line; and means responsive to said line activity signal for generating an echo suppression inhibit signal.

3. In combination;

means for translating digital codes representing sampled signal levels on a first line into a first amplitude code;

means for translating digital codes representing sampled signal levels on a second line into a second amplitude code;

means responsive to said first amplitude code for selectively altering a stored signal level code representing the stretched signal envelope on said first line;

means for comparing the said first amplitude code with a selected set of code signals to determine the current activity status of said first line;

means for simultaneously comparing said second amplitude code with said stored signal level code to determine if said second line is idle; and means for generating a control signal when said first line's assigned current activity status is an active status, and said second line is idle.

4. The combination of claim 3 further comprising;

means responsive to said control signal for activating echo suppression.

5. A digital echo suppressor in a multiplexed digital transmission system serving a plurality of odd-even line pairs, which comprises;

means for translating the digital codes generated by sampling a selected odd line in a given time slot into a first peak amplitude code;

means for translating the digital codes generated by sampling a selected even line in said time slot into a second peak amplitude code;

means for generating a stretched envelope level code which is a function of said first amplitude code and the first amplitude codes received during previous occurrences of said time slot;

comparator means for generating a line activity signal when a selected relation exists between said second peak amplitude code and said stretched envelope level code; and control means responsive to said line activity signal for deactivating echo suppression.

6. The digital echo suppressor of claim 5 wherein said control means further comprises;

means for combining said first peak amplitude code with a first stored status code that is a function of said first amplitude codes generated by digital codes received during previous occurrences of said time slot to determine the current activity status of said odd line; and means for combining said line activity signal with a code representing the pattern of occurrence of said line activity signals during previous occurrences of said time slot to determine the current activity status of said even line.

7. The digital echo suppressor of claim 6 wherein said control means further comprises;

means responsive to selected combinations of said activity statuses of said odd and even lines for activating echo suppression.

8. A digital echo suppressor in a communication system, which comprises;

a first time-shared threshold detector for translating the peak signal level on a first line into a first digital amplitude code;

a second time-shared threshold detector for translating the peak signal level on a second line into a second digital amplitude code; and time-shared control means responsive to said first and second digital amplitude codes for controlling the activation of echo suppression.

9. A digital echo suppressor in a communication system, which comprises;

a first time-shared threshold detector for translating the signal level on a first line into a first digital amplitude code in a selected time slot;

a first time-shared status control means responsive to said first digital amplitude code for generating a first current activity status code for said first line;

a second time-shared threshold detector for translating the signal level on a second line into a second digital amplitude code in said time slot;

time-shared envelope stretching means responsive to said first amplitude code for selectively altering a stored signal level code;

time-shared comparator means responsive to a selected combination of said stored signal level code and said second digital amplitude code for generating a line activity signal;

a second time-shared status control means responsive to said line activity signals for generating a second current activity status code for said second line; and time-shared means responsive to selected combinations of said first and second activity status codes for enabling echo suppression.

10. The digital echo suppressor of claim 9 further comprising;

a first time-shared timing means for generating a selected one of a first set of timing codes in said time slot;

a second time-shared timing means for generating a selected one of a second set of timing codes in said time slot;

wherein said first status control means is responsive to said first digital amplitude code and said selected timing code generated by said first timing means; and said second status control means is responsive to said line activity signal and said selected timing code generated by said second timing means.

11. The digital echo suppressor of claim 10 wherein said first timing means is responsive to said current activity status of said first line for varying the rate at which selected ones of the timing codes in said first set of timing codes is generated.

12. The digital echo suppressor of claim 10 wherein said second timing means is responsive to said current activity status of said second line for varying the rate at which selected ones of the timing codes in said second set of timing codes is generated.

13. A digital echo suppressor comprising;

a first encoder for translating the analogue signal level on a first line into a digital code;

a second encoder for translating the analogue signal level on a second line into a digital code;

a first threshold detector for translating said digital code output of said first encoder into a first peak amplitude code;

a second threshold detector for translating said digital code output of said second encoder into a second peak amplitude code;

control means responsive to selected combinations of said first and second peak amplitude codes for enabling echo suppression.

14. In a time-divided transmission system, the echo suppressor comprising;

a first scanner for repetitively scanning signal levels on a plurality of transmit lines in said transmission system;

a second scanner for repetitively scanning analogue signal levels on a plurality of receive lines in said transmission system;

a first encoder for translating the analogue signal level present on a transmit line associated with a selected time slot into a digital code signal;

a second encoder for translating the analogue signal level present on a given receive line associated with said time slot into a digital code signal;

a first threshold detector for translating the digital code output of said first encoder into a first peak amplitude code;

a second threshold detector for translating the digital code output of said second encoder into a second peak amplitude code;

means responsive to selected combinations of said first and second peak amplitude codes for generating a control signal; and means responsive to said control signal for controlling the operation of echo suppression in said time slot.

15. In a time-divided transmission system, the echo suppressor comprising;

a first time-shared encoder for translating the analogue signal level on a first line into a digital code in a selected time slot;

a second time-shared encoder for translating the analogue signal level on a second line into a digital code in said time slot;

a first time-shared threshold detector for translating said digital code output of said first encoder into a first peak amplitude code;

a second time-shared threshold detector for translating said digital code output of said second encoder into a second peak amplitude code; and time-shared control means responsive to selected combinations of said first and second amplitude codes for controlling echo suppression in said time slot.

16. An echo suppressor comprising;

means connected to a first line for approximating the peak signal amplitude on said first line;

means connected to a second line for approximating the peak signal amplitude on said second line;

envelope stretching meanS responsive to the approximated peak signal amplitude on said first line for statistically altering a stored signal level code representing the stretched signal envelope on said first line; and means responsive to the approximated peak signal amplitude for said second line and said stored signal level code for controlling the activation of echo suppression for said first and second lines.

17. The echo suppressor of claim 16 wherein said envelope stretching means further comprises;

a storage means containing said signal level code; and arithmetic means responsive to selected relationships between the approximated peak amplitude code for said first line and said stored signal level code for altering said signal level code.

* * * * *

UNITED STATES PATENT OFFICE

CERTIFICATE OF CORRECTION

Patent No. 3,673,355 Dated June 27, 1972

Inventor(s) Robert E. LaMarche and Carl J. May, Jr.

It is certified that error appears in the above-identified patent and that said Letters Patent are hereby corrected as shown below:

Column 1, line 29, delete "patent";
line 30, "U. S. Patent" should read --patent--.
Column 3, line 4, before "90", "code" should read --coder--.
Column 6, line 40, "$N_{L1}>O_{L1}$" should read --$N_{L1}<O_{L1}$--.
Column 7, line 65, "$LE_i$-LO" should read --$LE_i$-$LO_i$--.
Column 12, line 54, before "W'" insert --signal--.
Column 15, line 33, "$N_{L1}>S_o$" should read --$N_{L1}<S_O$--.
Column 16, line 31, "$N_{L1}>O_1$" should read --$N_{L1}>O_{L1}$--,
line 58, "01" should read --10--;
line 72, "$N_{L1}<O_1$" should read --$N_{L1}<O_{L1}$--.
Column 17, line 55, "$O_{L1}$ 1" should read --$O_{L1}=1$--.
Column 21, line 31, before "L01" insert --line--.

Signed and sealed this 30th day of January 1973.

(SEAL)
Attest:

EDWARD M.FLETCHER,JR.
Attesting Officer

ROBERT GOTTSCHALK
Commissioner of Patents